(12) United States Patent
Schuster

(10) Patent No.: US 12,359,418 B2
(45) Date of Patent: Jul. 15, 2025

(54) METHOD OF MOUNTING A TOILET AND SEALING ASSEMBLY USED IN PERFORMING THE METHOD

(71) Applicant: M3WE, Inc., Shorewood, IL (US)

(72) Inventor: Michael J. Schuster, Shorewood, IL (US)

(73) Assignee: M3WE, Inc., Shorewood, IL (US)

( * ) Notice: Subject to any disclaimer, the term of this patent is extended or adjusted under 35 U.S.C. 154(b) by 475 days.

(21) Appl. No.: 17/740,659

(22) Filed: May 10, 2022

(65) Prior Publication Data

US 2023/0366191 A1 Nov. 16, 2023

(51) Int. Cl.
*E03D 11/16* (2006.01)
*F16J 15/02* (2006.01)

(52) U.S. Cl.
CPC ............ *E03D 11/16* (2013.01); *F16J 15/022* (2013.01)

(58) Field of Classification Search
CPC ............ E03D 11/16; F16J 15/022; F16L 5/10
See application file for complete search history.

(56) References Cited

U.S. PATENT DOCUMENTS

| | | | |
|---|---|---|---|
| 6,691,331 B2 | 2/2004 | Gallacher et al. | |
| 9,273,455 B2 | 3/2016 | Schuster | |
| 9,758,957 B2 * | 9/2017 | Schuster | ................. E03D 11/17 |
| 9,765,507 B2 | 9/2017 | Schuster | |
| 9,816,261 B2 | 11/2017 | Schuster | |
| 9,909,296 B2 | 3/2018 | Schuster | |
| 10,017,932 B2 | 7/2018 | Mehari | |
| 10,100,505 B2 | 10/2018 | Coronado | |
| 10,294,647 B2 | 5/2019 | Coronado et al. | |
| 10,415,224 B2 | 9/2019 | Schuster | |
| 10,669,707 B2 | 6/2020 | Schuster | |
| 10,683,653 B2 | 6/2020 | Schuster | |

(Continued)

FOREIGN PATENT DOCUMENTS

| BR | 102013031190-1 A2 | 12/2016 |
|---|---|---|
| CA | 2137033 A1 | 5/1996 |

(Continued)

*Primary Examiner* — Janie M Loeppke
(74) *Attorney, Agent, or Firm* — Wood, Phillips, Katz, Clark & Mortimer

(57) ABSTRACT

A method of mounting a toilet using a closet collar having an upper surface transitioning to an annular surface portion at an outside annular corner, including the steps of: obtaining a sealing assembly including a sleeve having a body with: a) a top and bottom spaced from each other in an axial direction; b) a radially outwardly projecting mounting flange with an axially downwardly facing surface; c) a top horn engaging region; and d) an annular force transmission region; placing the sleeve in a starting position; lowering the toilet towards the support surface to thereby cause: a) the toilet horn to initially contact the horn engaging region of the sleeve body; b) the toilet to progressively axially compress the force transmission region of the sleeve body; and c) the compressing force transmission region to cause a part of the radially projecting mounting flange to be drawn downwardly as an incident of which an annular region of the axially downwardly facing surface on the radially outwardly projecting mounting flange is forcibly wrapped against the outside corner on the closet collar.

23 Claims, 36 Drawing Sheets

(56) References Cited

U.S. PATENT DOCUMENTS

| | | |
|---|---|---|
| 10,745,899 B2 * | 8/2020 | Guthrie .................. E03D 11/17 |
| 11,021,862 B2 | 6/2021 | Schuster |
| 11,220,813 B2 | 1/2022 | Schuster |
| 11,274,429 B2 | 3/2022 | Schuster |
| 2001/0023505 A1 | 9/2001 | Atkins |
| 2003/0052461 A1 * | 3/2003 | Ponce ..................... E03D 11/16 |
| | | 277/608 |
| 2005/0108814 A1 | 5/2005 | Thompson |
| 2014/0062035 A1 | 3/2014 | Coronado et al. |
| 2014/0366256 A1 | 12/2014 | Coronado |
| 2020/0284017 A1 * | 9/2020 | Duncan .................. E03D 11/16 |

FOREIGN PATENT DOCUMENTS

| | | |
|---|---|---|
| CA | 2578327 A1 | 8/2008 |
| CN | 107044163 A | 4/2017 |
| WO | 2014016703 A2 | 1/2014 |
| WO | 2016054771 A1 | 4/2016 |

* cited by examiner

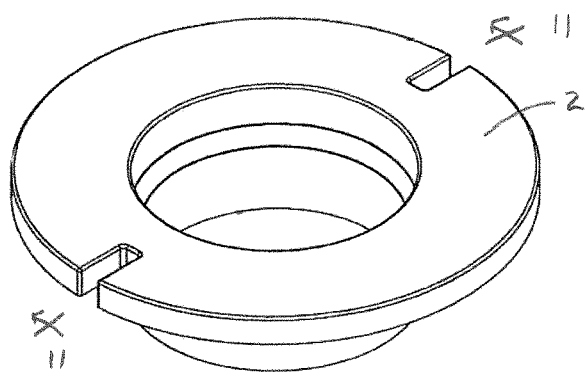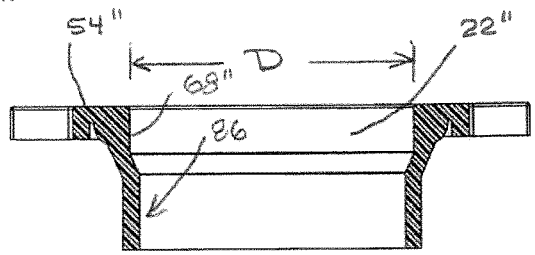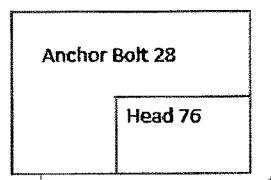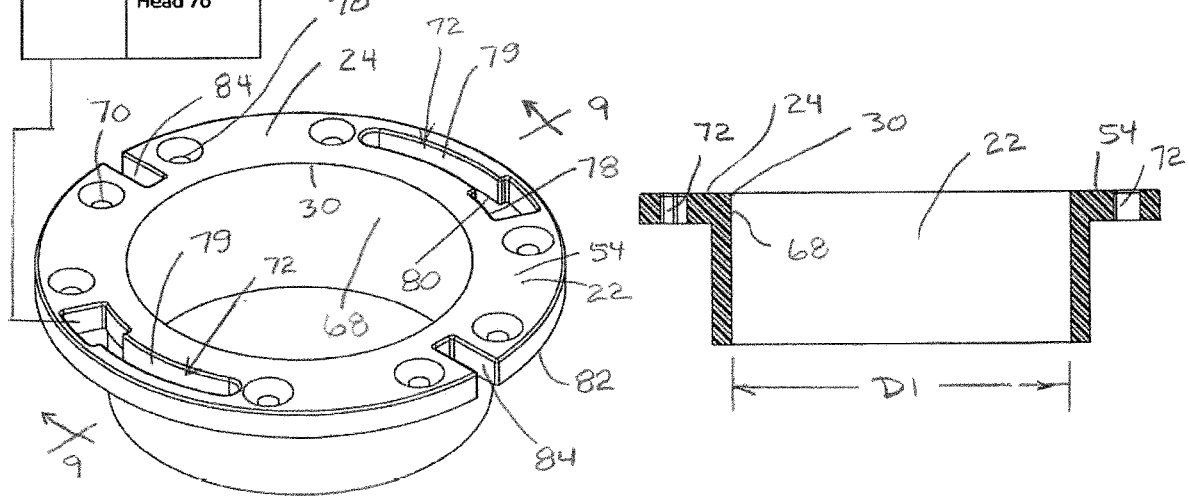

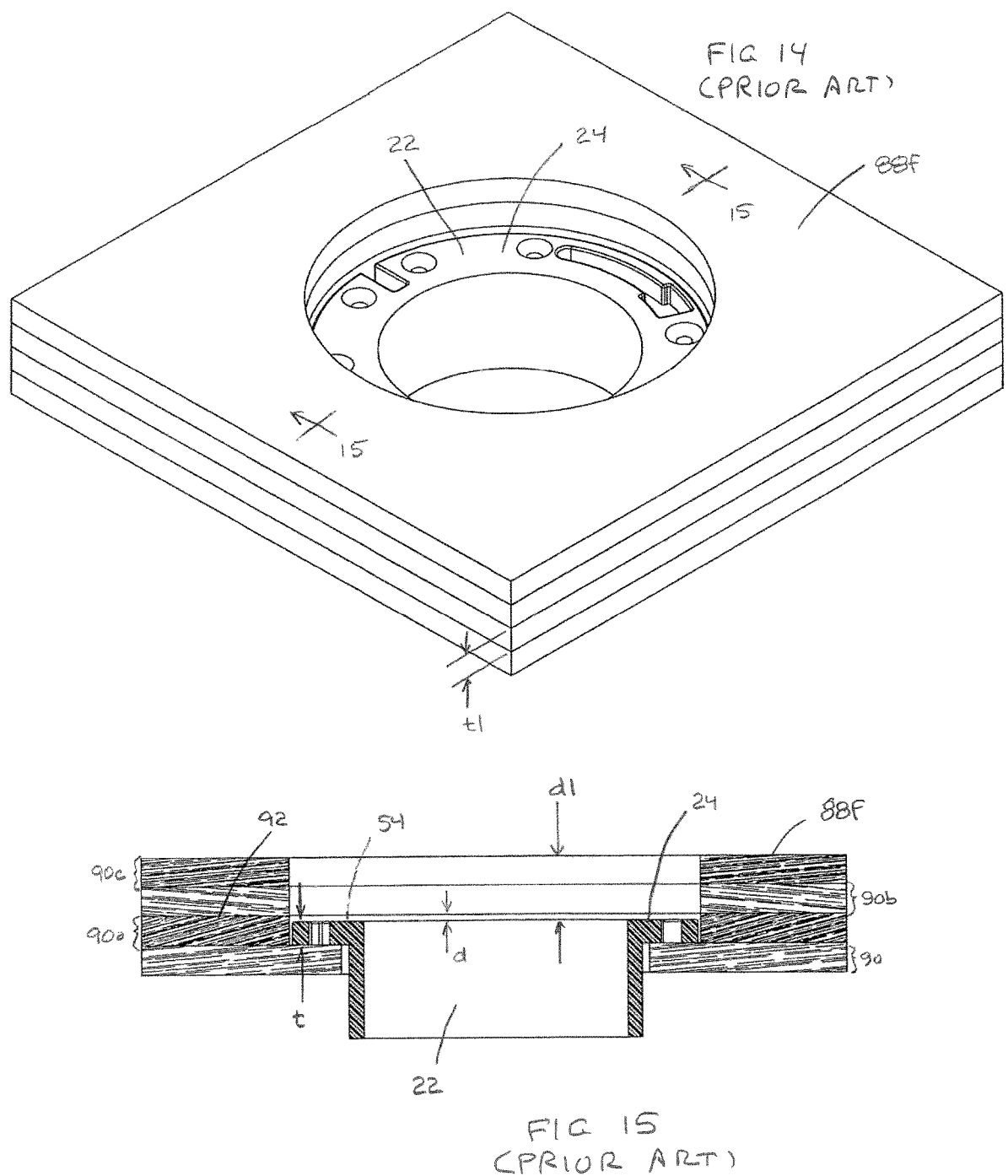

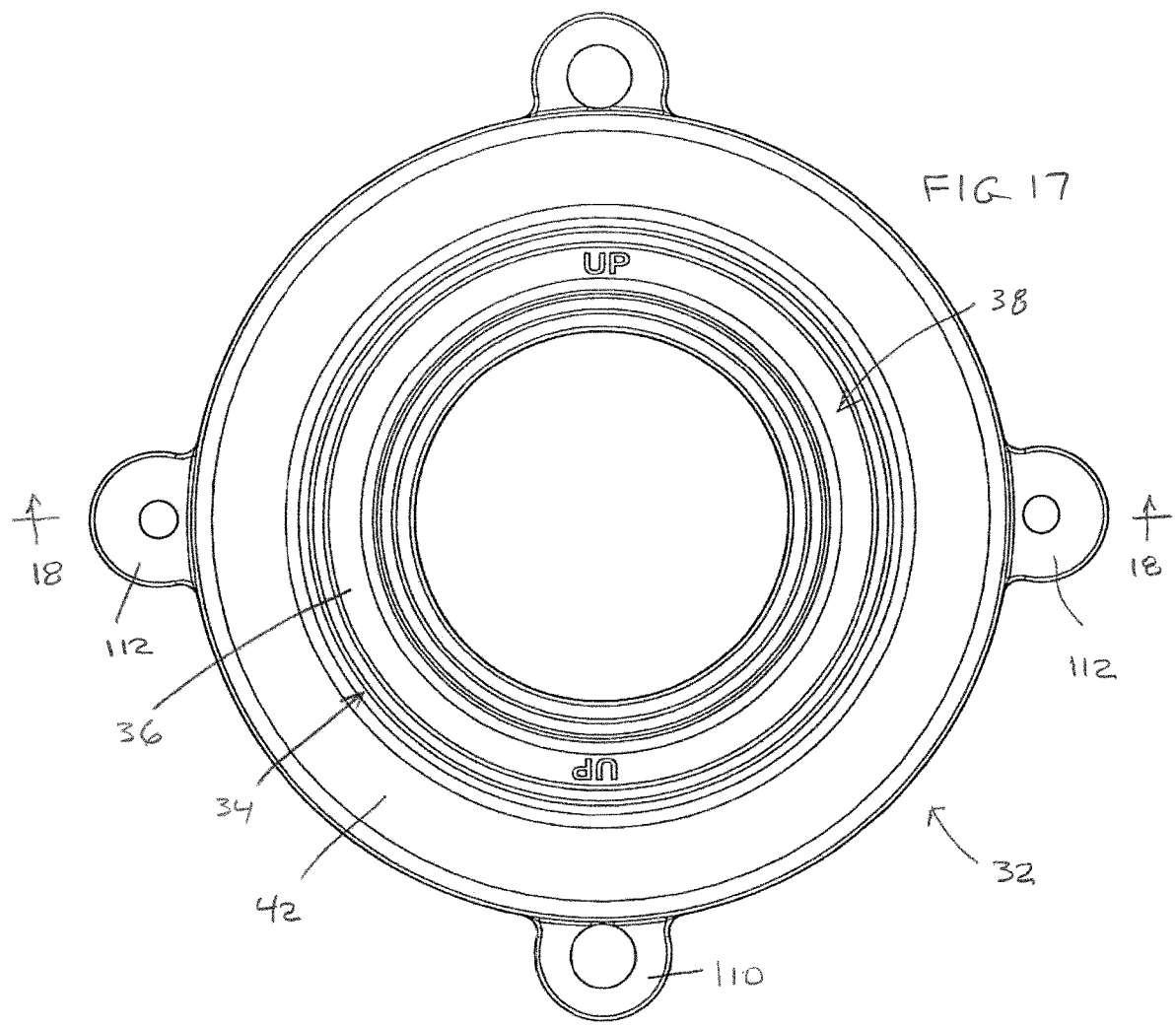
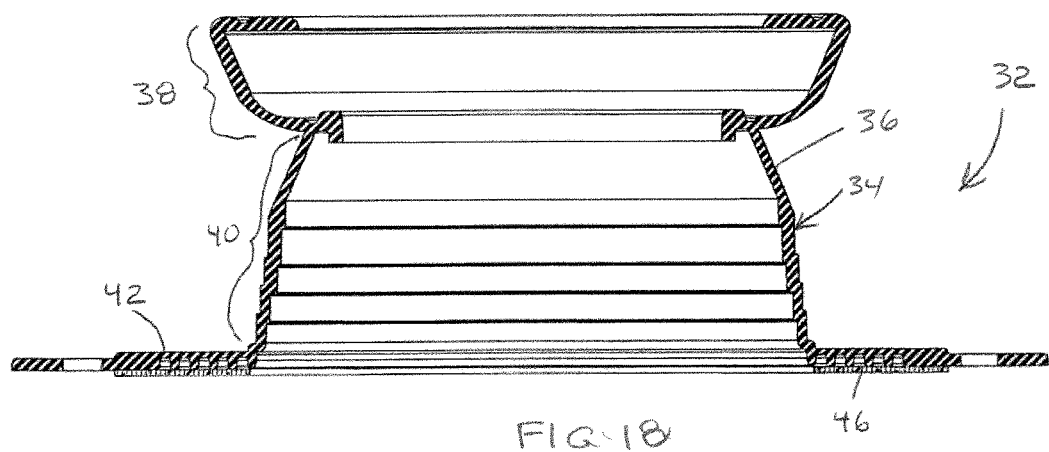

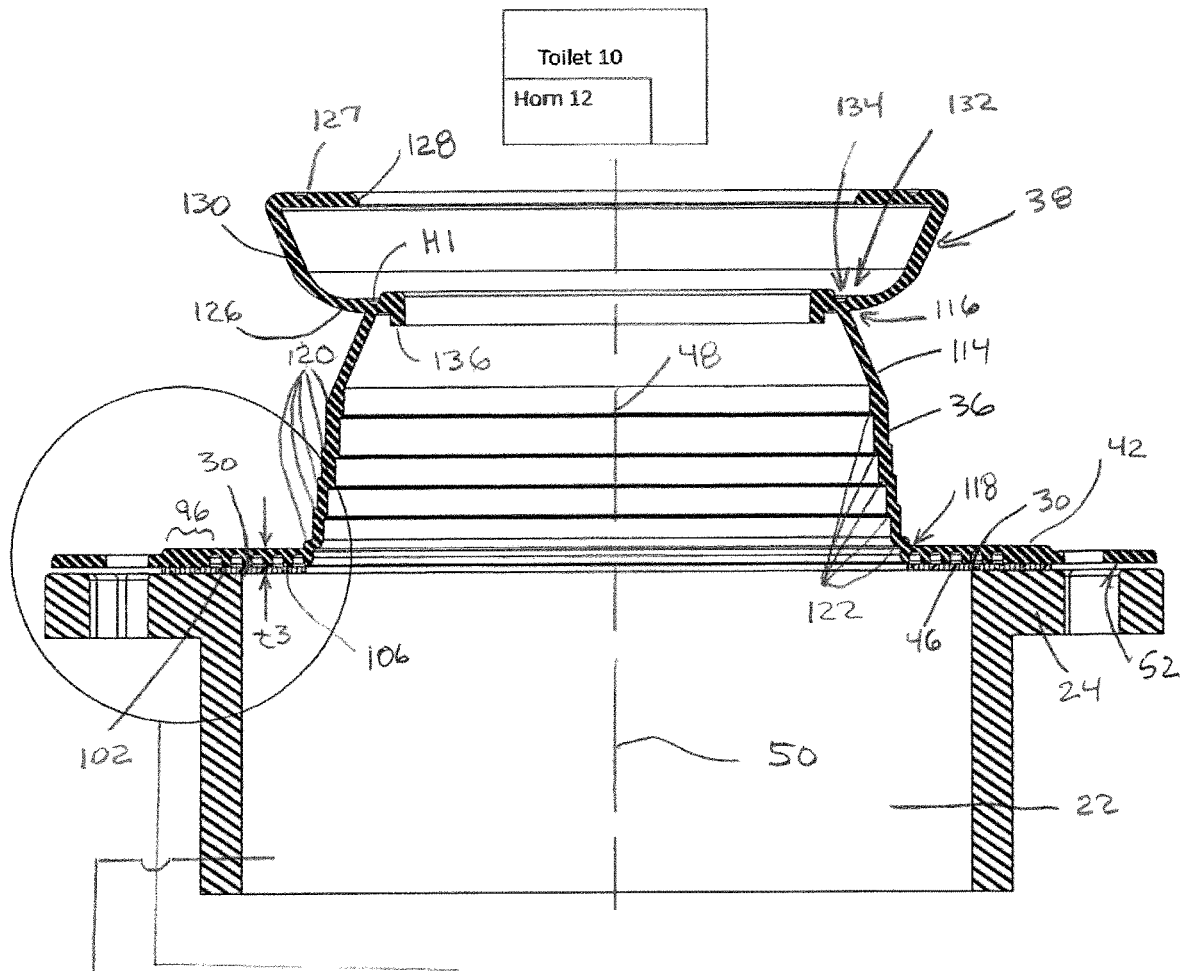
FIG 20
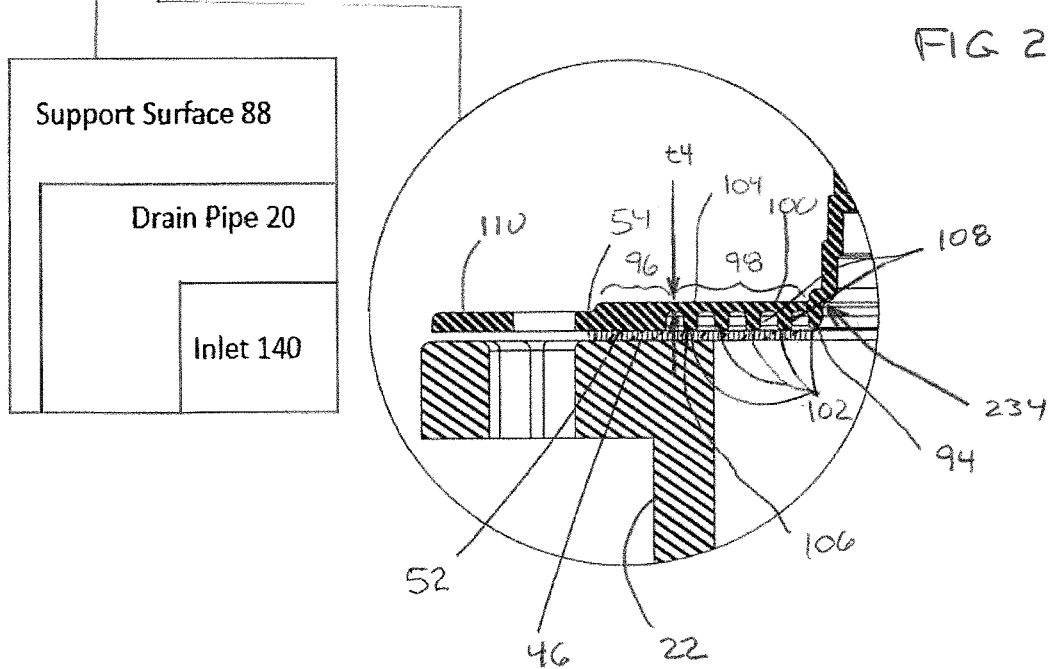

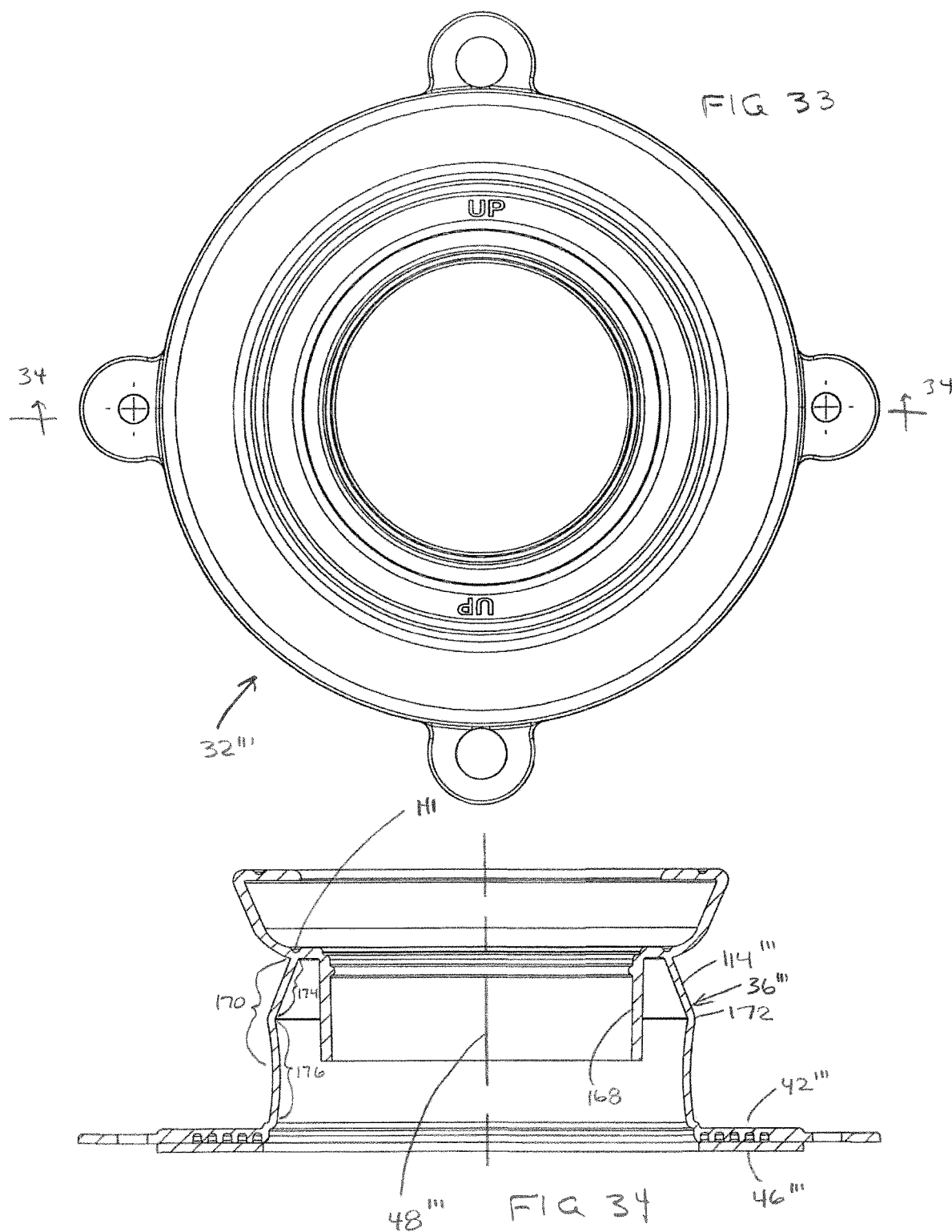

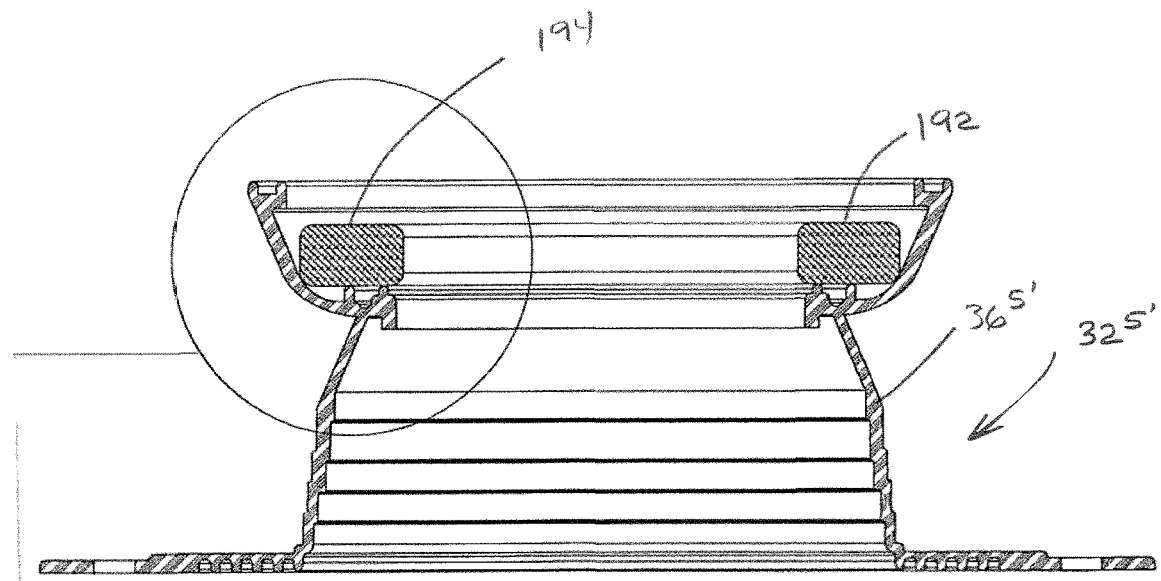
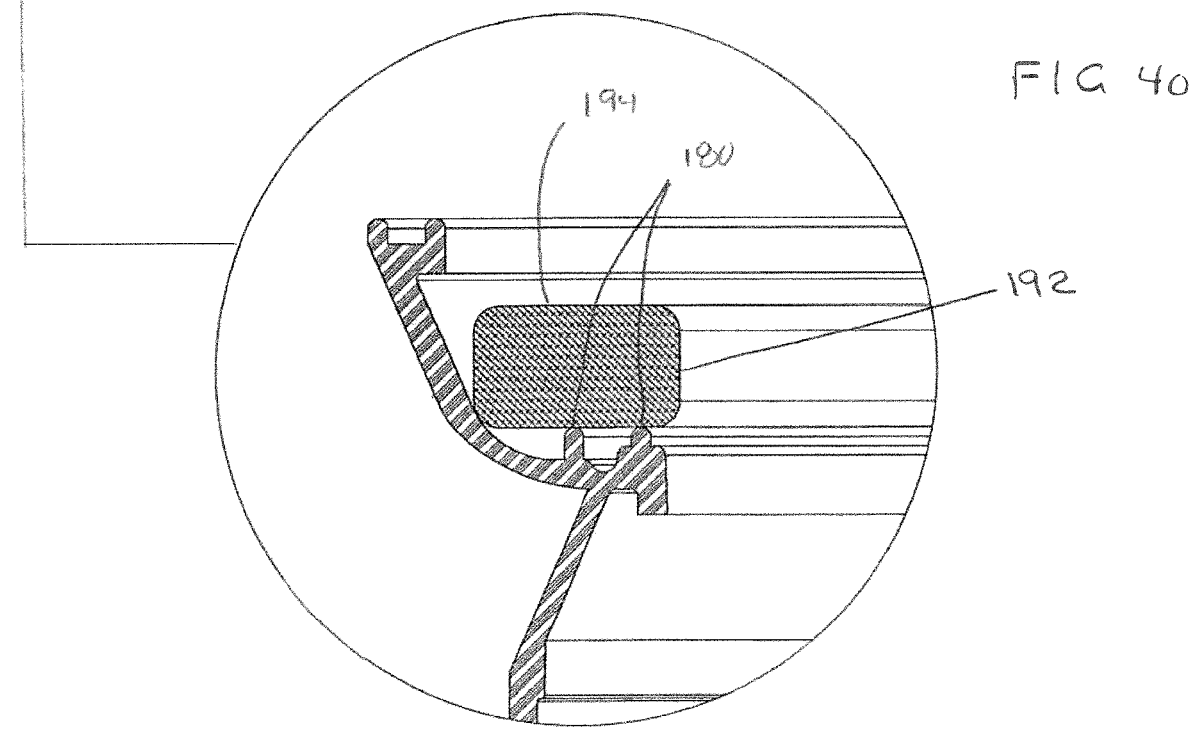
FIG 40

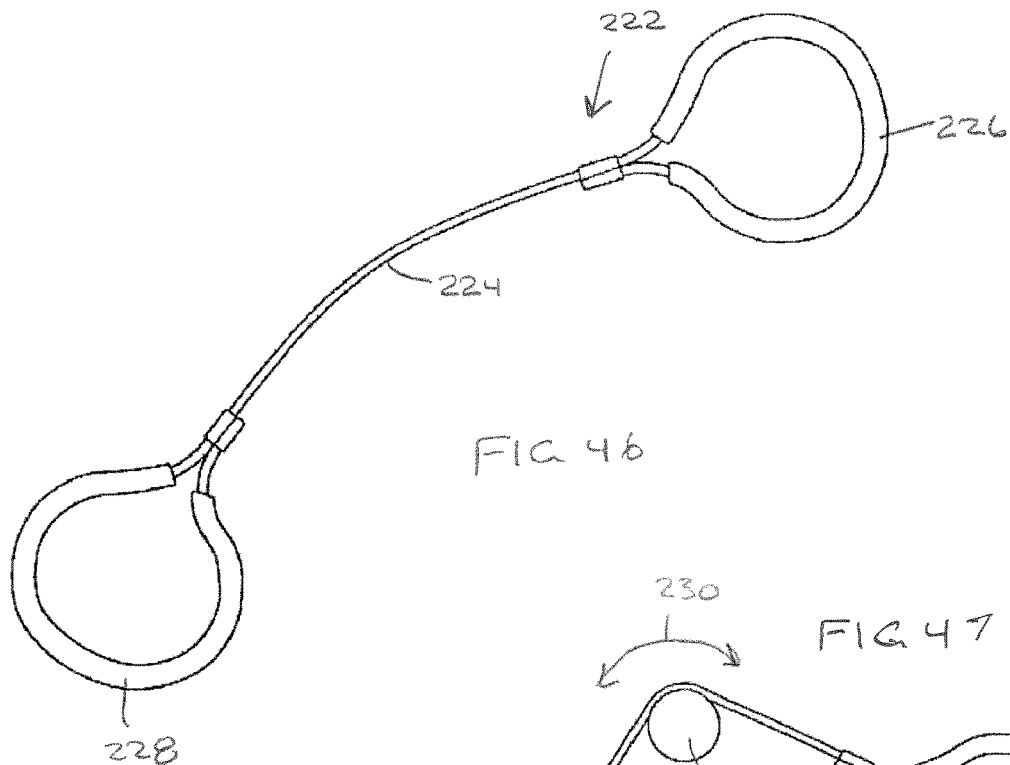
FIG. 46
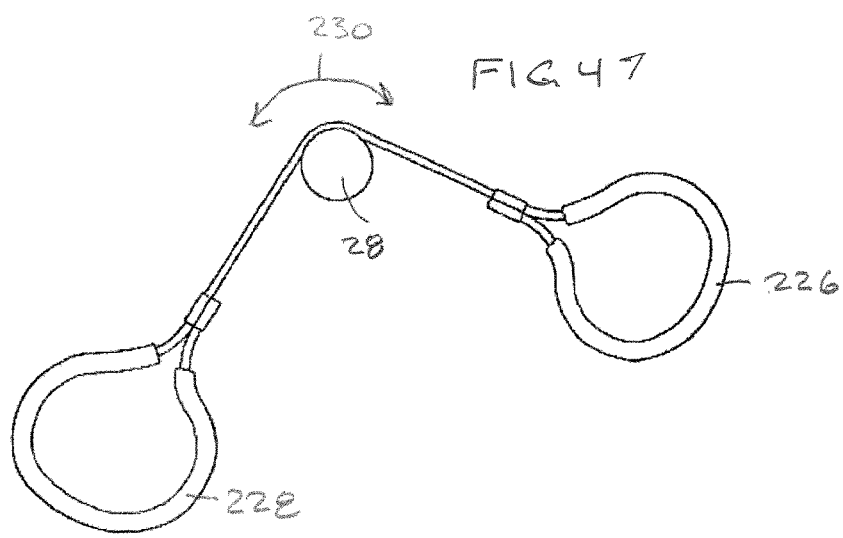
FIG. 47
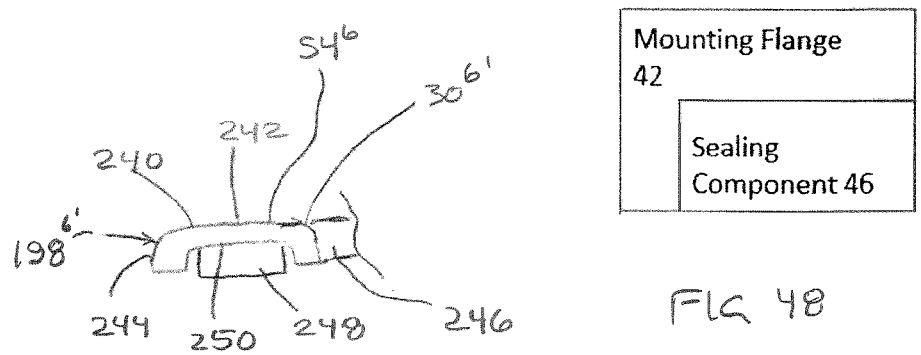
FIG. 48
FIG. 49

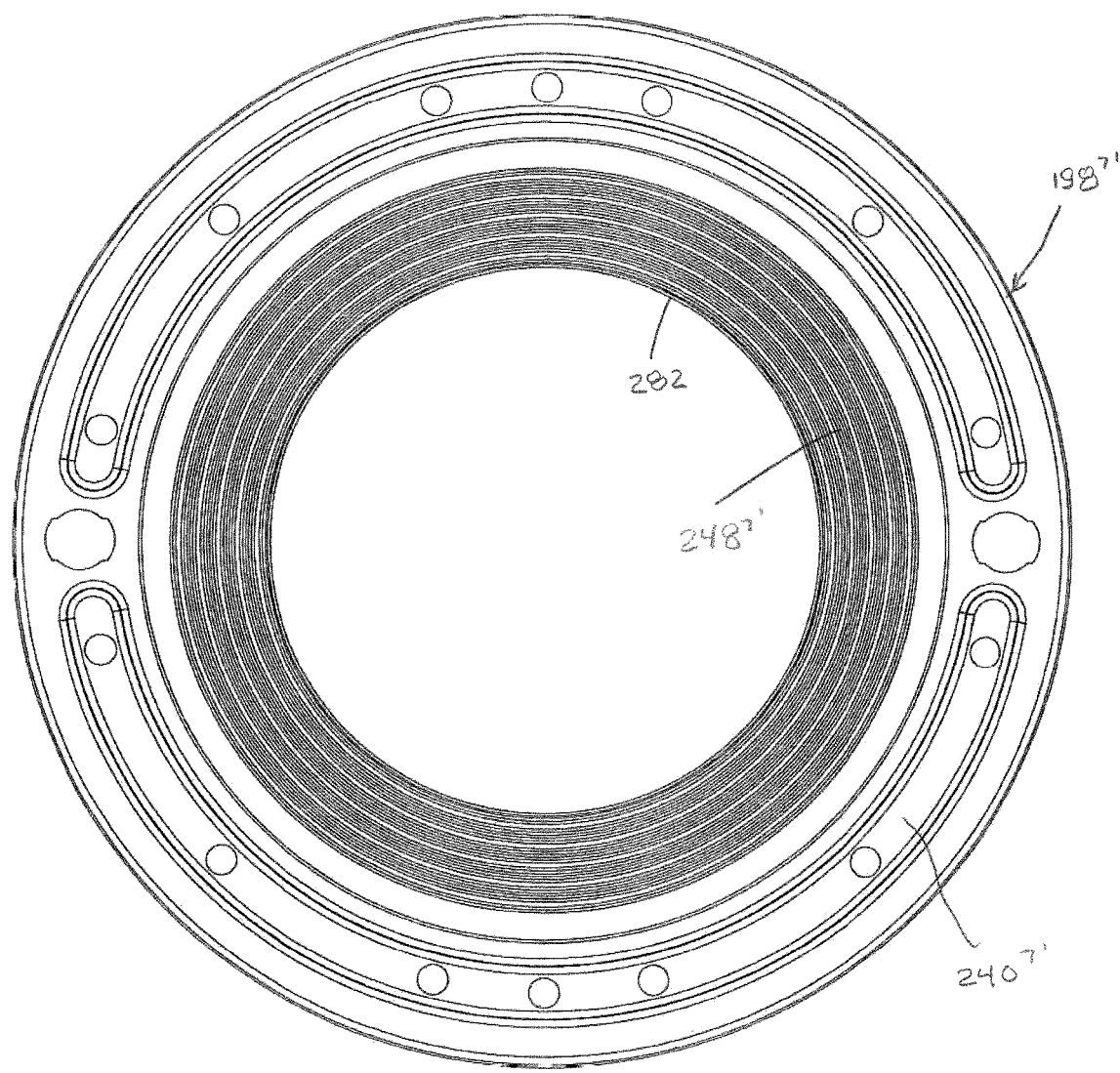
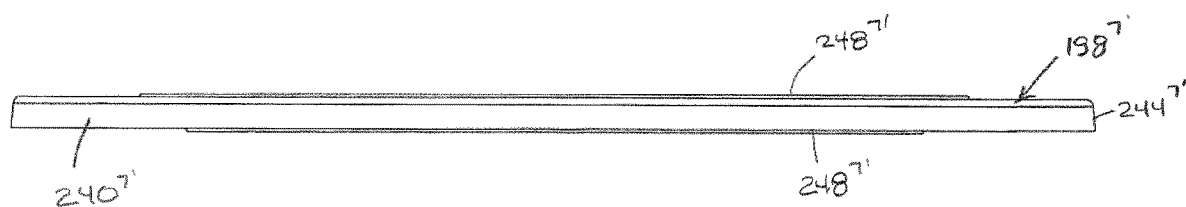

METHOD OF MOUNTING A TOILET AND SEALING ASSEMBLY USED IN PERFORMING THE METHOD

BACKGROUND OF THE INVENTION

Field of the Invention

This invention relates to toilet mounting and, more particularly, to a method of mounting a toilet to a support surface using a closet collar, fixable relative to the support surface, and a sealing assembly that cooperates between the toilet and fixed closet collar. The invention is also directed to the associated sealing assembly structure.

Background Art

Closet collars are commonly utilized to effect connection between a toilet and a drain pipe and to fix the toilet relative to a floor surface. Anchor bolts are connected to the closet collar and project upwardly from a flange thereon to facilitate securing of the toilet. Commonly, one or more components, sealing between the toilet and the closet collar, act against an upwardly facing/upper surface of a flange on the closet collar.

Depending upon how a closet collar is installed, the relationship of the upper flange surface thereon to a support surface against which the toilet bears may vary over a considerable range.

In one common site configuration, the bottom surface of the closet collar flange bears against a floor-level surface. The closet collar can be fixed directly to the finished bathroom floor surface, be it tile, laminate, wood, linoleum, etc. A typical closet collar flange thickness varies from ⅜ inch to ¼ inch, whereby the upper flange surface is spaced by this amount from the finished floor surface.

In other applications, the closet collar is attached to a subfloor. Subsequently, underlayment and flooring may be built up around the closet collar flange. It is common for multiple layers of flooring to be built up without removing any pre-existing layers, whereupon years of remodeling may result in the upper surface of the closet collar flange residing significantly below the finished floor surface. It is not uncommon for the upper surface of a closet collar flange to reside 1½ inches below the finished floor surface.

In one exemplary construction scenario, a closet collar is attached to a subfloor, followed by ¼ inch of underlayment, over which linoleum flooring is installed. Thereafter, another ¼ inch underlayment is attached with glued vinyl tiles. Years later, a ¾ inch hardwood floor is installed.

In another scenario, hardwood flooring is installed and, over time and particularly when exposed to a damp bathroom environment, becomes unsightly. A remodeling may involve the placement of a ½ inch thick substrate over the compromised wood flooring before the addition of ¼ inch tile. This type of remodeling may progressively stack layers that result in the upper surface of the closet collar flange being spaced up to 1¾ inches below the eventually finished floor surface.

Accordingly, a toilet installer faces a wide range of field conditions ranging from the upper surface of the closet collar flange being spaced above the finished floor surface to the upper surface of the closet collar flange being well below the finished floor surface. The challenge to all installers is to be able to install the same toilet with any of the above site conditions while avoiding leakage of water and sewer gas.

The challenge of creating and maintaining seals is further increased by the need to adapt to different configurations of closet collar. Closet collar flanges transition to connect to a range of different drain pipes—typically from 3-4 inches. These pipes in turn have different inside dimensions, ranging commonly from 2.9 inches to 4 inches. These drain pipes are commonly constructed of materials like cast iron, copper, ABS, or PVC plastics. Between the closet collar flange and the drain pipe is an annular edge/corner where the upper, horizontal closet collar flange surface transitions to the drain pipe. The annular transition surface portion may be at various angles with respect to the upper flange surface but in any event defines in conjunction therewith an annular outside corner. This corner diameter typically ranges from 3¾ inches to 4¾ inches.

Most commonly, sealing components act between the upper surface of the closet collar flange and a bottom surface on the toilet. Well known seals use various different materials, such as petroleum-based wax, TPE, TPR, EVA, flexible PVC, closed cell foam rubber coated open cell foam, PP, ABS, POM, plastics, etc. Most seals are made from a petroleum-based wax or foam. These sealing components are designed to be placed against the upper flange surface on the closet collar, which is typically approximately parallel to the finished bathroom floor surface that supports the toilet. However, the top surface of the closet collar flange is an imperfect sealing surface that has holes, slots, inclusions, protrusions, etc. A number of holes are provided to allow fasteners to be directed therethrough to fix the closet collar with respect to the support surface. Slots are provided in the flange and are configured to accommodate anchor bolts in a manner that the heads of the anchor bolts become captive between an axially facing surface on the flange, offset from the upper surface, and an oppositely facing surface against which the flange is placed. These anchor bolts are used to fix the fully mounted toilet to a support surface therefor.

Commonly, a bottom wall of the toilet, against which sealing components act, sits approximately ½ inch above the finished floor surface. This creates a sealing gap, varying with the vertical relationship between the upper flange surface and supporting floor surface, typically spaced in the range of ⅛ to 2½ inches. In order to accommodate this entire range, manufacturers commonly offer seals in different thicknesses and different configurations that can be stacked to adapt to different thicknesses. Accordingly, installers, such as homeowners, may be forced to purchase multiple sealing components dictated by the relative vertical spacing between the bottom sealing surface of the toilet and the upper surface of the closet collar flange. Average homeowners unfamiliar with toilet installation may be making purchases of sealing components in a rather blind manner. To err on the safe side, multiple components may be purchased, which may turn out to be unsuitable for the particular application. This may necessitate multiple trips to a hardware store potentially resulting in multiple purchases and exchanges.

In the event that the closet collar flange is mounted to project above the finished floor, a relatively thin sealing component is required. A sealing component must be able to compress down to approximately ⅛ inch. If this compression does not fully occur, the result is that the bottom of the toilet is maintained slightly off of the finished floor surface. This can create an unstable sealing condition and usually results in leaks. In an effort to avoid this condition, installers/homeowners may be tempted to overtighten anchor bolts, which could result in a failure of the closet collar flange and/or damage to the porcelain toilet, such as by the generation of one or more cracks.

It is known to incorporate a funnel on thicker wax seals and on rubber seals to direct water into a drain pipe. These funnels may interfere with compression of seals between the toilet and closet collar by limiting downward movement into smaller closet collar openings. Previously, this problem was addressed by using thin plastic or rubber funnels that would bend readily to avoid interference. However, the problem with plastic and rubber funnels is that they can bend inward and block the drain pipe opening. Some manufacturers have recognized the collapsing funnel issue and have constructed the funnel out of thicker plastic or rubber material that does not compress. This creates the problem that the thicker funnel may not translate downwardly adequately that the toilet will go down to the level of the support surface, as a result of which it may be held slightly thereabove, which creates an unstable mount and may result in leakage of both sewer gas and water.

When the upper surface of the closet collar flange is below the finished surface by, for example, 1¾ inches, multiple wax or foam gaskets may be required to be compressed between the upper surface of the closet collar flange and the bottom surface of the toilet. As noted above, this forces purveyors of these components to offer multiple wax and foam thicknesses and creates confusion for installers, and particularly homeowners with less installation experience. Further, stacking gaskets may be an ineffective way to seal a toilet, which may result in leakage paths that are immediately present or develop over time. Further, this multiple sealing requirement may involve a trial and error exercise while repetitively raising and lowering a relatively heavy toilet. Multiple attempts may be required to re-seat the toilet when it is determined that the selected gasket arrangement is either thicker or thinner than necessary—in the former case avoiding proper seating of the toilet and in the latter case creating gaps for leakage of sewer water and gas.

It is also known to form seals that extend into a drain pipe and create a seal around the inside of the horn of the toilet. This requires the purchase of potentially different seals based on the different diameters of the drain pipe. For example, the inside diameter of the pipe can range from 2⅞ inches to 4 inches. The inside dimension of a 4-inch drain pipe can vary significantly between standard weight cast iron, extra heavy cast iron, PVC, or copper, which is further complicated by the fact that the inside sealing surface can be irregular due to buildup of rust and scale.

It is also known to extrude wax into drain pipe openings to seal across a wide range of pipe diameters. The problem with this approach is that it requires multiple rubber gaskets assembled over the wax to cover the potentially wide range of gap—⅜ to 1½ inches. Another issue is that the wax is produced from petroleum that increases in cost with the cost of oil. Furthermore, these seals rely on the wax to provide resistance as the seal is being compressed during installation. This resistance is what molds a seal lip around the toilet horn. Once the wax is compressed and re-shaped, it will not assume its original configuration once a load thereon is removed. Accordingly, it cannot practically be reused.

As an example, if no flooring is added to an existing bathroom floor, the closet collar flange may be recessed by ¼ inch or more. Seals that use wax will not return to their original height if reuse is attempted. Accordingly, a new seal is required. Furthermore, seals that extrude wax or other materials into the pipe are made larger than the closet collar edge converging into the drain pipe opening to prevent the extruded material from falling into the drain pipe. This creates excessive material between the flange and the toilet and can result in the toilet being wedged upwardly by the seal from the finished floor to prevent direct engagement with the upper floor surface.

It is also known to use flange extensions to raise the upper sealing surface of the flange and decrease the required vertical thickness of the seal that might otherwise necessitate the use of multiple components. To prevent passage of sewer gas, a seal is placed between the upper surface on the existing closet collar flange and the flange on the flange extension. The flange on the flange extension is screwed down with a second seal placed between the flange extension and the toilet. If multiple extensions are required, seals are used between each extension. Furthermore, flanges have a tendency to break around the slotted areas provided to accommodate anchor bolts. When the anchor bolts are overtightened, or the toilet rocks, this can put undue stress on the flange which is weakened by the slotted areas accommodating the anchor bolts. As a result, the bolts may pull through. Further, if there is a leak above the metal flange, water exposure may cause the metal to erode or rust, which may weaken the anchor bolt region to the point that the anchor bolt pulls away from the flange. This may necessitate use of a repair flange which is fixed over the top of the existing flange. A seal is used between the old and new flanges with a separate seal required between the repair flange and the toilet.

In spite of the recognition of many of the above problems for decades, those in the plumbing industry have continued to contend with them since practical solutions have not been arrived at.

SUMMARY OF THE INVENTION

In one form, the invention is directed to a method of mounting a toilet with a discharge horn with respect to an upwardly facing support surface at which there is an exposed inlet on a drain pipe and a closet collar with a flange fixed with respect to the support surface and extending around the drain pipe inlet, as viewed from above. The fixed flange has a vertical axis, an upper surface and an annular surface portion extending to below the upper flange surface. The upper flange surface transitions to the annular surface portion at an outside annular corner. The method includes the steps of: obtaining a sealing assembly including a sleeve having a body with an axis, the sleeve body having: a) a top and bottom spaced from each other in an axial direction; b) a radially outwardly projecting mounting flange with an axially downwardly facing surface; c) a top horn engaging region; and d) an annular force transmission region; placing the sleeve body in a starting position and a starting state wherein: a) the axis of the sleeve body is generally aligned with the axis of the closet collar flange; and b) the axially downwardly facing surface on the radially outwardly projecting mounting flange extends across, and to radially inside of, the outside annular corner on the closet collar; and with the toilet horn aligned over the axis of the fixed closet collar flange, lowering the toilet towards the support surface to thereby cause: a) the toilet horn to initially contact the horn engaging region of the sleeve body; b) the toilet to progressively axially compress the force transmission region of the sleeve body; and c) the compressing force transmission region to cause a part of the radially projecting mounting flange to be drawn downwardly as an incident of which an annular region of the axially downwardly facing surface on the radially outwardly projecting mounting flange is forcibly wrapped against the outside corner on the closet collar.

In one form, the sealing assembly further includes at least one sealing component. With the sleeve body in the starting position and the starting state, at least a part of the at least one sealing component is situated between the axially downwardly facing surface on the radially outwardly projecting mounting flange and the upper surface of the closet collar flange. The step of lowering the toilet towards the support surface causes the annular region of the axially downwardly facing surface on the radially outwardly projecting mounting flange to press at least a part of the at least one sealing component, underlying the forcibly wrapped annular region of the downwardly facing surface on the radially outwardly projecting mounting flange, against the outside corner on the closet collar as the annular region of the axially downwardly facing surface on the radially outwardly projecting mounting flange is forcibly wrapped against the outside corner on the closet collar.

In one form, the method further includes the step of confining inward radial movement of the radially outwardly projecting mounting flange relative to the upper surface of the closet collar flange at a plurality of circumferentially spaced locations.

In one form, the step of confining inward radial movement of the radially outwardly projecting mounting flange involves providing first and second tabs on the radially outwardly projecting mounting flange at circumferentially spaced locations and using first and second anchor components that engage the closet collar and respectively engage the first and second tabs.

In one form, the first anchor component is a first anchor bolt. The method further includes the step of using the first anchor bolt to fix the toilet relative to the support surface with the toilet in a fully mounted position.

In one form, the radially outwardly projecting mounting flange has first and second radially spaced annular portions. The first annular portion is radially outside of the second annular portion and more resistant to axial flexing than the second annular portion.

In one form, with the sleeve body in the starting position and the starting state, the second annular portion of the radially outwardly projecting mounting flange extends across the outside annular corner.

In one form, the second annular portion of the radially outwardly projecting mounting flange has a plurality of spaced annular rings.

In one form, the top horn engaging region is configured so that the top horn engaging region sealingly engages the toilet discharge horn on the toilet with the toilet in a fully mounted position and the sleeve body in a final state.

In one form, the top horn engaging region sealingly engages the toilet discharge horn by compressibly wrapping against an outside peripheral surface on the toilet discharge horn.

In one form, there is an axially facing pushing portion defined on the sleeve body at a transition region between the top horn engaging region and the annular force transmission region. The toilet discharge horn has a bottom region that bears against the axially facing pushing portion to transfer a downward force from the lowering toilet to the annular force transmission region.

In one form, the annular force transmission region on the sleeve body has a wall with a non-uniform radial thickness.

In one form, the annular force transmission region has axially spaced upper and lower annular wall regions. The lower annular wall region of the annular force transmission region is axially collapsible under a lesser axial force than the upper annular wall region of the annular force transmission region. As the toilet is lowered an axial force is exerted on the lower annular wall region of the annular force transmission region through the upper annular wall region of the force transmission region, thereby causing the annular region of the axially downwardly facing surface on the radially outwardly projecting mounting flange to be urged into wrapped engagement with the outside annular corner on the closet collar.

In one form, the sealing assembly is configured so that as the toilet is lowered at least a part of the upper annular wall region of the annular force transmission region is placed in compression. At least a part of the lower annular wall region of the annular force transmission region is placed in tension and thereby exerts a force that draws the annular region of the axially downwardly facing surface on the radially outwardly projecting mounting flange against the outside corner on the closet collar.

In one form, the sealing assembly is configured so that as the toilet is lowered the sleeve body controllably collapses. An axial length of the upper annular wall region of the annular force transmission region moves into axially overlapping relationship with an axial length of the lower annular wall region of the annular region of the annular force transmission region. The axial length of the upper annular wall region of the annular force transmission region resides radially inside of the axial length of the lower annular wall region of the annular force transmission region.

In one form, the wall on the annular force transmission region has a plurality of axially spaced steps defining annular reinforcing ribs.

In one form, with the toilet lowered to a fully mounted position, the sleeve body assumes a final state wherein a part of the top horn engaging region is urged against the radially outwardly projecting mounting flange so as to thereby urge a part of the annular region towards the outside corner of the closet collar.

In one form, the sleeve body has an outer wall. A funnel body is in axially overlapping relationship with the outer wall and has a portion residing radially inside of the outer wall and spaced radially from the outer wall with the sleeve body in the starting state.

In one form, the at least one sealing component is molded integrally with the sleeve body.

In one form, a repair flange is obtained. The method further includes the step of placing the repair flange over the first and second tabs and using first and second anchor bolts extending upwardly through the repair flange to fix the toilet in a final mounting position.

In one form, the invention is directed to a sealing assembly as described above.

BRIEF DESCRIPTION OF THE DRAWINGS

FIG. 8 is a perspective view of one form of a conventional closet collar;

FIG. 9 is a cross-sectional view of the closet collar taken along line 9-9 of FIG. 8;

FIG. 10 is a view as in FIG. 8 of another form of conventional closet collar;

FIG. 11 is a cross-sectional view of the closet collar taken along line 11-11 of FIG. 10;

FIG. 14 is a view as in FIG. 12 wherein a support surface has been built up around the fixed closet collar;

FIG. 15 is a cross-sectional view of the fixed closet collar taken along line 15-15 of FIG. 14;

FIG. 17 is a top view of the sealing assembly in FIG. 16;

FIG. 18 is a cross-sectional view of the sealing assembly taken along line 18-18 of FIG. 17;

FIG. 20 is a cross-sectional view of the sealing assembly taken along lines 20-20 of FIG. 16 and situated atop the closet collar in FIG. 8;

FIG. 33 is a plan view of the sealing assembly in FIGS. 31 and 32;

FIG. 34 is a cross-sectional view of the sealing assembly taken along line 34-34 of FIG. 33;

FIG. 40 is a view as in FIG. 39 wherein a sealing component is interposed between the sealing assembly and toilet;

FIG. 46 is a plan view of a cutting tool, according to the invention, usable to sever a length of an anchor bolt used to fix a toilet in a mounting position;

FIG. 47 is a view as in FIG. 46 with the cutting tool wrapped against an anchor bolt shank and being moved back and forth to effect cutting thereof;

FIG. 48 is a schematic representation of a mounting flange on the inventive sealing assembly with an integrally formed sealing component;

FIG. 49 is a fragmentary, cross-sectional view of a specific form of repair flange, as shown schematically in FIG. 41;

FIG. 51 is a bottom view of the repair flange in FIG. 50;

FIG. 52 is a side elevation view of the repair flange in FIGS. 50 and 51;

DETAILED DESCRIPTION OF THE PREFERRED EMBODIMENT

Figure 1:
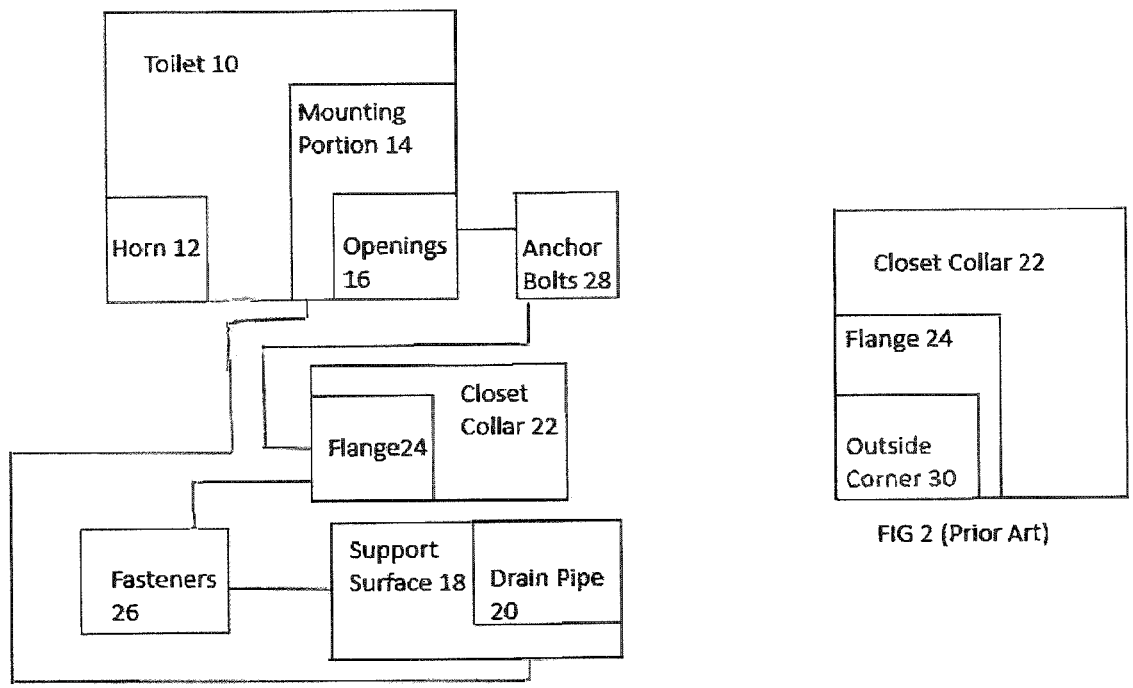
FIG. 1 is a schematic representation of a prior art environment for the present invention, including a toilet that is mounted to a support surface using a closet collar.

In FIG. 1, a schematic representation of an environment for the present invention is depicted and consists of a toilet 10 having a discharge horn 12 and a mounting portion 14 through which a plurality of openings 16 are formed.

The toilet 10 is mounted to a support surface 18 at which a drain pipe 20 is located.

The toilet 10 is fixed in its desired mounting position utilizing a closet collar 22 with a flange 24. Fasteners 26 are directed through the flange 24 into the support surface 18 to fix the closet collar 22 relative to the support surface 18.

Anchor bolts 28 project upwardly from the flange 24 and are either fixed thereto or held thereagainst to allow the anchor bolts 28 to be braced against the flange 24 whereby they cannot be drawn upwardly to be separated therefrom. The anchor bolts 28 project, one each, through the openings 16 and are suitably secured to complete the installation.

It should be understood that the FIG. 1 depiction is general in nature and should not be viewed as limited to any specific details. The purpose of including FIG. 1 is to identify an exemplary environment for the present invention.

Figure 2:
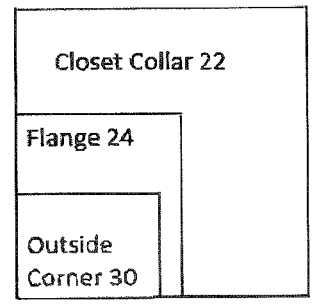
FIG. 2 is a schematic representation of a conventional closet collar as shown in FIG. 1.

In FIG. 2, additional details regarding the conventional closet collar 22 are depicted. More specifically, the flange 24 on the closet collar 22 has an annular outside corner 30, commonly at the transition between an upwardly facing/upper surface on the flange 24 and an annular surface portion extending below the upwardly facing/upper surface of the flange 24.

Figure 3:
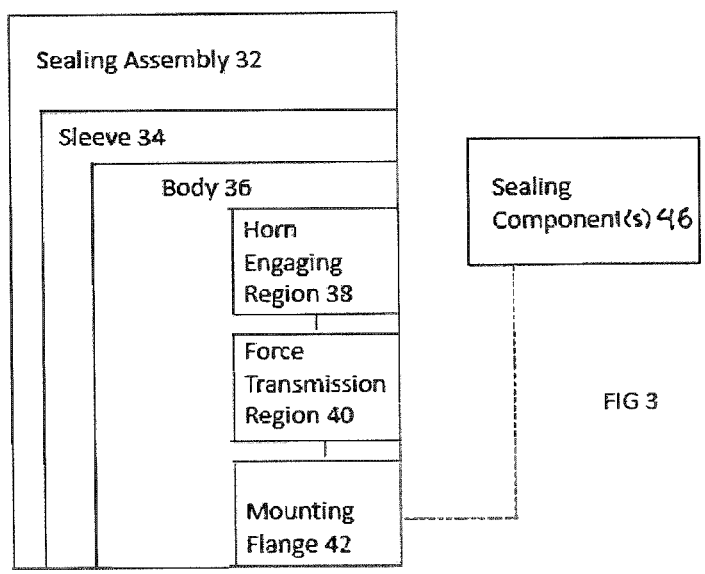
FIG. 3 is a schematic representation of a sealing assembly, according to the invention, usable in mounting a toilet to a closet collar as in FIG. 1.

According to the invention, a toilet is mounted utilizing a sealing assembly as shown at 32 in FIG. 3.

The sealing assembly 32 consists of a sleeve 34 having a body 36 with an axis. The sleeve body 36 has a top horn engaging region 38, an annular force transmission region 40, and a radially outwardly projecting mounting flange 42.

It should be emphasized that the environment for the present invention is not limited to the specific details in any of the FIGS. herein. Further, orientation designations used throughout are arbitrary in nature and used for establishing relative orientations of components since the closet collar could be mounted on surfaces with different orientations—from horizontal to vertical. For purposes of simplicity and to describe the relationship between components, the surface on the closet collar flange facing upwardly with the closet collar fixed on a horizontal surface will be described as "upwardly facing"/"upper" regardless of the actual mounting orientation of the closet collar—for example, even when it is mounted to a vertical wall.

Further, the sealing assembly 32 as depicted in FIG. 3 is not limited to any specific structure as described in exemplary forms hereinbelow. The generic showing in FIG. 3 is intended to encompass the exemplary forms and virtually an unlimited number of variations of the components thereof and their interaction.

Additionally, the sealing assembly 32 may optionally include at least one additional sealing component 46 that may be integrally formed with the mounting flange 42 or exist as a separate element that cooperates with the mounting flange 42 as hereinafter described. The sealing component(s) 46 is shown connected to the mounting flange 42 in dotted lines since it is optionally part of the sealing assembly 32.

Figure 4:
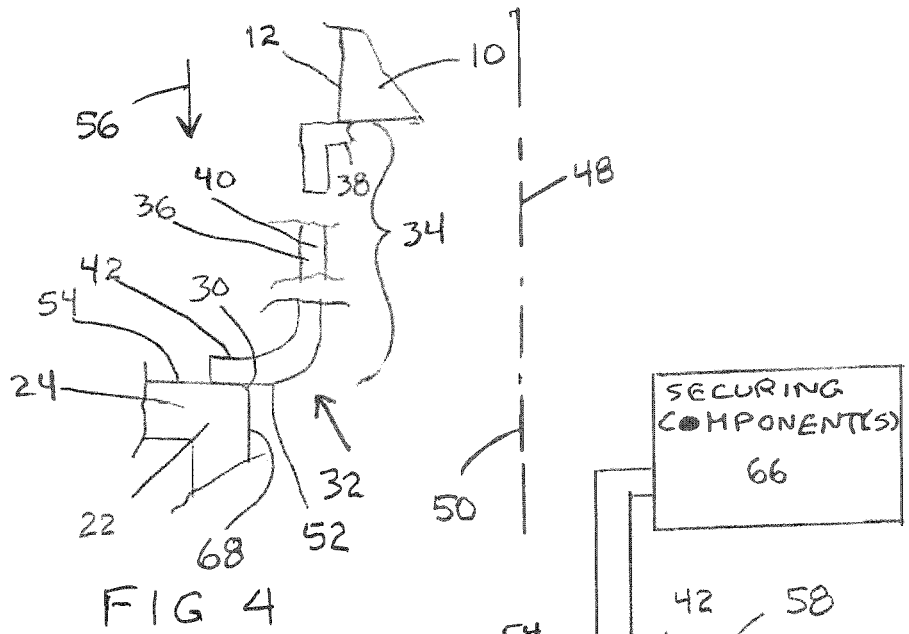
FIG. 4 is a fragmentary, schematic representation of an outside corner on a closet collar flange in relationship to a sealing assembly, according to the invention, with a body on the sealing assembly in a starting position and a starting state.
Figure 5:
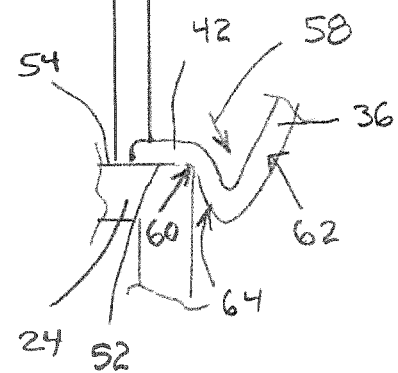
FIG. 5 is a view as in FIG. 4 wherein the body on the sealing assembly is changed from a starting state to or towards a final state as a toilet is lowered thereagainst during installation.

One aspect of the inventive method is shown sequentially and schematically in FIGS. 4 and 5.

In FIG. 4, a part of a toilet horn 12 is shown initially engaged with a sleeve body 34, that is part of the sleeve assembly 32, with the sleeve body 34 in a starting position and starting state, wherein an axis 48 of the sleeve body 36 is generally aligned with the axis 50 of the flange 24 on the closet collar 22. An axially downwardly facing surface 52 on the radially outwardly projecting mounting flange 42 rests against the upwardly facing/upper surface 54 on the flange 24. The axially downwardly facing surface 52 extends across, and to radially inside of, the outside corner 30.

The toilet horn 12 is aligned over the axis 50 of the closet collar 22 and the flange 24 thereon and lowered, as indicated by the directional arrow 56. As this occurs, the toilet horn 10 initially contacts the horn engaging region 38 of the sleeve body 36. Continued downward movement causes the weight of the toilet 10 to progressively axially compress the force transmission region 40 of the sleeve body 36. The compressing force transmission region 40 causes part of the radially projecting mounting flange 42 to bend downwardly, as indicated by the arrow 58 in FIG. 5, as an incident of which an annular region 60 of the axially downwardly facing surface 52 on the mounting flange 42 is forcibly wrapped against the outside corner 30 to effect a seal thereat.

As the toilet 10 is lowered, an axial length 62 of the force transmission region 40 is placed in compression, which places an axial length 64 of a portion of the wrapped annular region 60, and potentially an axial length of the force transmission region 40 where it transitions to the mounting flange 42, in tension, With the toilet 10 in its fully mounted position, the wrapped annular region 60 remains in tension to consistently maintain the seal at the corner 30.

At least one securing component 66 connects between the mounting flange 42 and closet collar flange 24 to confine radially inward movement of the mounting flange 42 relative to the upper surface 54 of the closet collar flange 24 as the axial length 64 is placed in tension and the annular region 60 of the downwardly facing surface 52 is wrapped against the corner 30.

As depicted in FIGS. 4 and 5, the closet collar 22 has an annular surface portion 68 extending axially to below the upper surface 54 to define the annular outside corner 30 at the junction therebetween. As depicted, the surface 54 and surface portion 68 are substantially orthogonal to each other.

Figure 6:
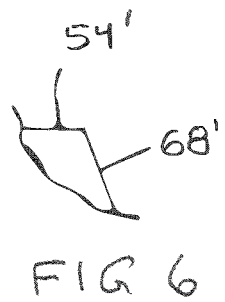
FIG. 6 is a fragmentary, cross-sectional representation of an outside corner on a closet collar flange between an upper surface and a surface portion extending below the upper surface.

As shown in FIG. 6, the corresponding surface 54' and surface portion 68' may be in other than orthogonal relationship, as seen in cross-section defined by a plane containing the axis 50.

There is no limitation as to the angular relationship between the surface 54 and surface portion 68, so long as they cooperatively define at their juncture a projecting "outer" configuration/corner which allows the annular region 60 of the downwardly facing surface 52 of the mounting flange 42 to be wrapped sealingly thereagainst.

Figure 7:
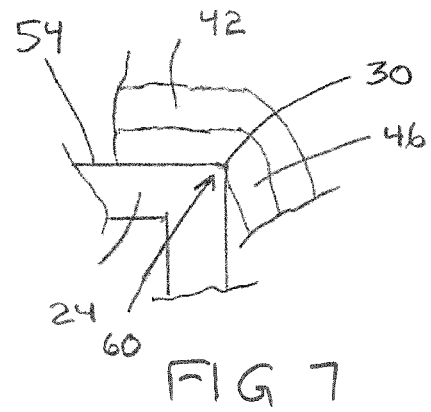
FIG. 7 is a view generally as in FIG. 5 wherein a separate sealing component is used as part of the sealing assembly to bear against an outside corner on a closet collar flange.

As shown in FIG. 7, with the sealing assembly 32 additionally including a sealing component 46, the same wrapping action occurs for the annular region 60, resulting in the sealing component 46, which underlies the mounting flange 42, being pressed against the outside corner 30 to effect the aforementioned sealing action.

In FIGS. 8-15, different exemplary, conventional closet collars, that can be utilized to practice the present invention, are depicted and fixed with different site conditions.

In FIGS. 8 and 9, a conventional 4-inch closet collar is shown at 22 with a flange 24 having an upwardly facing/upper surface 54.

The flange 24 has a plurality of circumferentially spaced openings 70, each to accept one of the aforementioned fasteners 26 to fix the closet collar 22 to a support surface 18. Each of the openings 70 has an undercut configuration to accept the heads on the fasteners 26 so that the heads reside flush with, or beneath, the upper surface 54. Diametrically opposite keying slots 72 are provided to each accommodate an anchor bolt, 28. Each anchor bolt 28 has a head 76 that can be directed into an entry portion 78, whereupon the anchor bolt 28 can be slid along an arcuate guide slot 79 to place the head 76 in confronting relationship with a downwardly facing edge 80 spaced slightly above the bottom 82 of the flange 24. With the flange 24 fixed using the fasteners 26, the anchor bolt heads 76 are captive between the edges 80 and an oppositely facing surface against which the bottom 82 of the flange 24 is placed.

Diametrically opposite and radially oppositely opening slots 84 are also formed through the flange 24.

The aforementioned outside corner 30 is defined between the upper surface 54 and the annular surface portion 68, with the surface 54 and surface portion 68 making a right angle with each other as seen in the cross-sectional view in FIG. 9.

As can be seen, there are numerous interruptions in the upper surface 54 which reduce potential surface area engagement with a sealing component that is complementary to the upwardly facing surface 54 in terms of the annular ring shape. That is, each of the openings 70, slots 72, and slots 84 effectively eliminates sealing area at the surface 54.

In FIGS. 10 and 11, a conventional 3-inch closet collar is shown at 22". The closet collar 22' has a stepped through passage, with the largest diameter D being defined by the annular surface portion 68", which transitions to the upper surface 54" at the outer annular corner 30", corresponding to the corner 30 on the closet collar 22.

Accordingly, the corner 30" has a diameter D that is less than the diameter D1 of the corresponding outside corner 30 on the closet collar 22.

Figure 12:
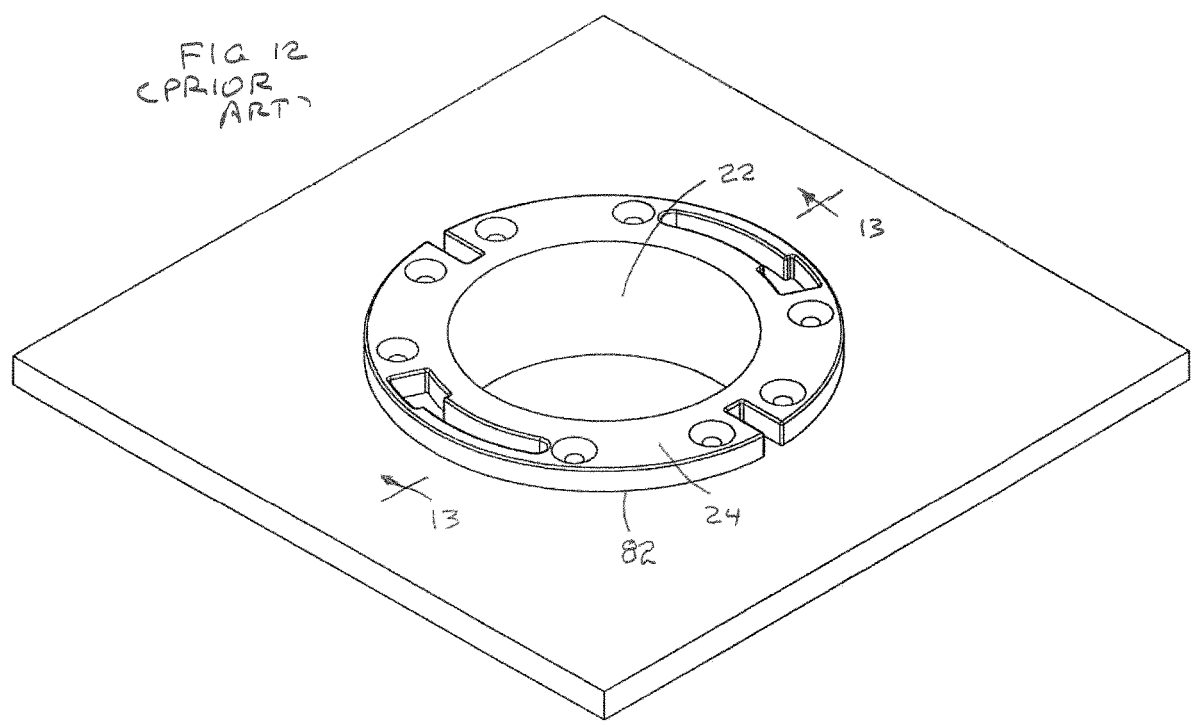
FIG. 12 is a fragmentary perspective view of the closet collar in FIGS. 8 and 9 fixed with respect to a support surface.
Figure 13:
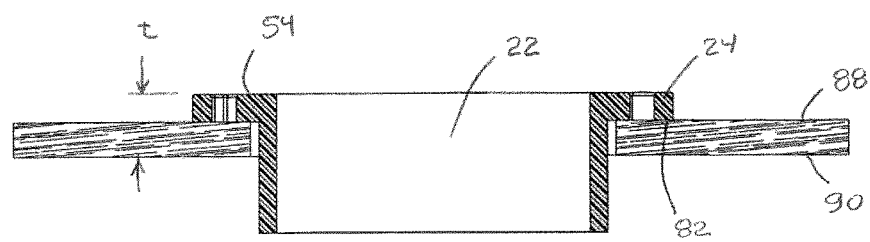
FIG. 13 is a cross-sectional view of the fixed closet collar taken along line 13-13 of FIG. 12.
Figure 16:
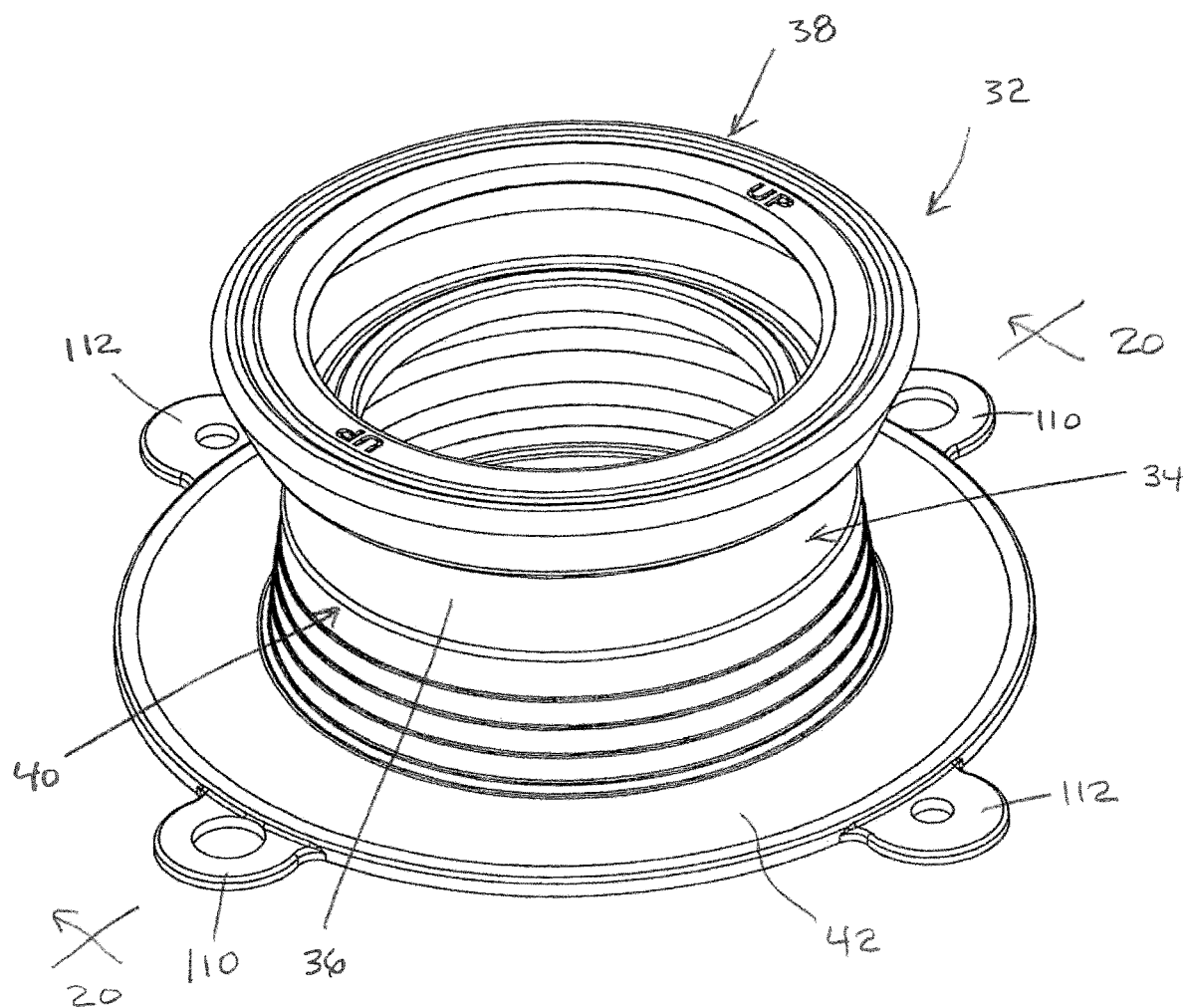
FIG. 16 is a perspective view of one form of the inventive sealing assembly, as shown schematically in FIG. 3.
Figure 19:
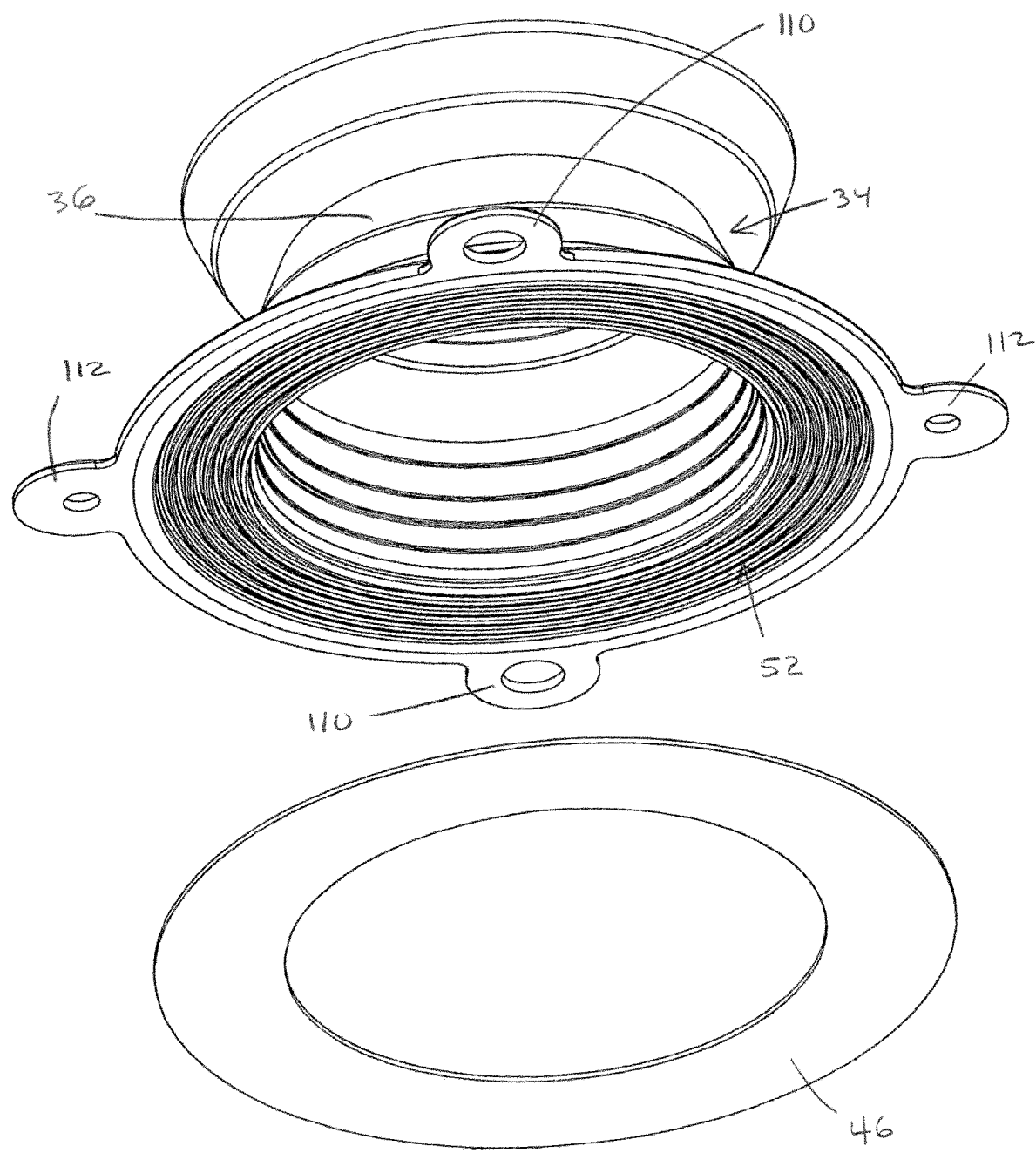
FIG. 19 is an exploded perspective view of the sealing assembly in FIGS. 16-18 and showing a separate sealing component thereon.

In FIGS. 12 and 13, the closet collar 22 is shown fixed with respect to a support surface 88 upon which the toilet 10 bears when in a fully mounted position. The bottom 82 of the flange 24 bears directly upon the support surface 88. As a result, the upper flange surface 54 is spaced above the support surface 88 a distance equal to the thickness t of the flange 24. As depicted, the support surface 88 is defined by a single thickness component/layer 90.

In FIGS. 14 and 15, the same closet collar 22 is shown fixed with respect to the component/layer 90. However, as described in the Background section herein, three additional components/layers 90a, 90b, 90c are serially stacked upon the component/layer 90. The components/layers 90a, 90b, 90c may be any composition, be it plywood, tile, wood laminate, etc. Further, the buildup may be effected at the same time or in different time periods, with it being decided to change the support surface without removing any existing components/layers.

As depicted, the component/layer 90a has a thickness t1 slightly greater than the thickness t of the closet collar flange 24, whereby the upper flange surface 54 is axially below the upper surface 92 of the component/layer 90a a distance d, equal to t1−t.

The component/layer 90c defines the final support surface 88f upon which the mounted toilet is seated.

Accordingly, the upper surface 54 of the flange 24 is spaced below the final support surface 88f in FIGS. 14 and 15 a distance d1, equal to the combined thicknesses of the components/layers 90b and 90c plus the thickness difference d.

The description with respect to FIGS. 8-15 is intended to set forth just exemplary closet collar configurations usable with the invention as well as exemplary site conditions. The flange configurations and site conditions may each vary significantly from those depicted.

In FIGS. 16-24, one preferred exemplary form of the sealing assembly 32 is shown. In this embodiment, the sealing assembly 32 includes an annular sealing component 46.

The sealing assembly 32 has the aforementioned sleeve 34 with a body 36 consisting of a horn engaging region 38, a force transmission region 40, and a radially outwardly projecting mounting flange 42. As depicted, the sleeve body 36 is formed, as by molding, as one piece.

The sealing assembly 32 is shown in FIGS. 20-24 as it cooperates with the closet collar 22 depicted in FIGS. 8, 9, 12, and 13.

The mounting flange 42 is configured to be supported upon the upper surface 54 fully around the axis 48 of the body 36. In FIG. 20, the sleeve body 36 is shown in a starting position and a starting/relaxed state wherein the axis 48 of the sleeve body is generally aligned with the axis 50 of the closet collar flange 24.

The downwardly facing surface 52 extends across, and to radially inside of, the outside annular corner 30 on the closet collar 22. The mounting flange surface 52 is at the bottom 94 of the sleeve body 36.

The mounting flange 42 has first and second radially spaced annular portions 96, 98, with the first annular portion 96 radially outside of the second annular portion 98. The first annular portion 96 is configured to be more resistant to axial bending than the second annular portion 98. This can be accomplished in different ways, such as making the first and second annular portions 96, 98 of different axial thickness.

As depicted, the second annular portion 98 is effectively thinner by reason of being made with an upper annular wall portion 100 from which a plurality of spaced, concentric, annular rings 102 depend. The axial thickness t3 between the top 104 of the wall portion 100 and the bottoms 106 of the rings is the same as the corresponding dimension of the first annular portion 96, though this is not a requirement. The spaced rings 102 produce therebetween annular relief regions 108, whereby the effective bending thickness of the second annular region 98 is the axial thickness t4 of the wall portion 100.

As seen clearly in FIG. 20, the second annular portion 98 on the mounting flange 42 extends across the annular outside corner 30 to reside both radially inwardly and outwardly therefrom with the sleeve body 36 in the starting position and starting state of FIG. 20.

As described with respect to FIG. 5, a single securing component 66 or multiple securing components 66 confine inward radial movement of the mounting flange 42 relative to the upper surface 54 of the closet collar flange 24. This is accomplished in the depicted form by structure at circumferentially spaced locations.

Figure 21:
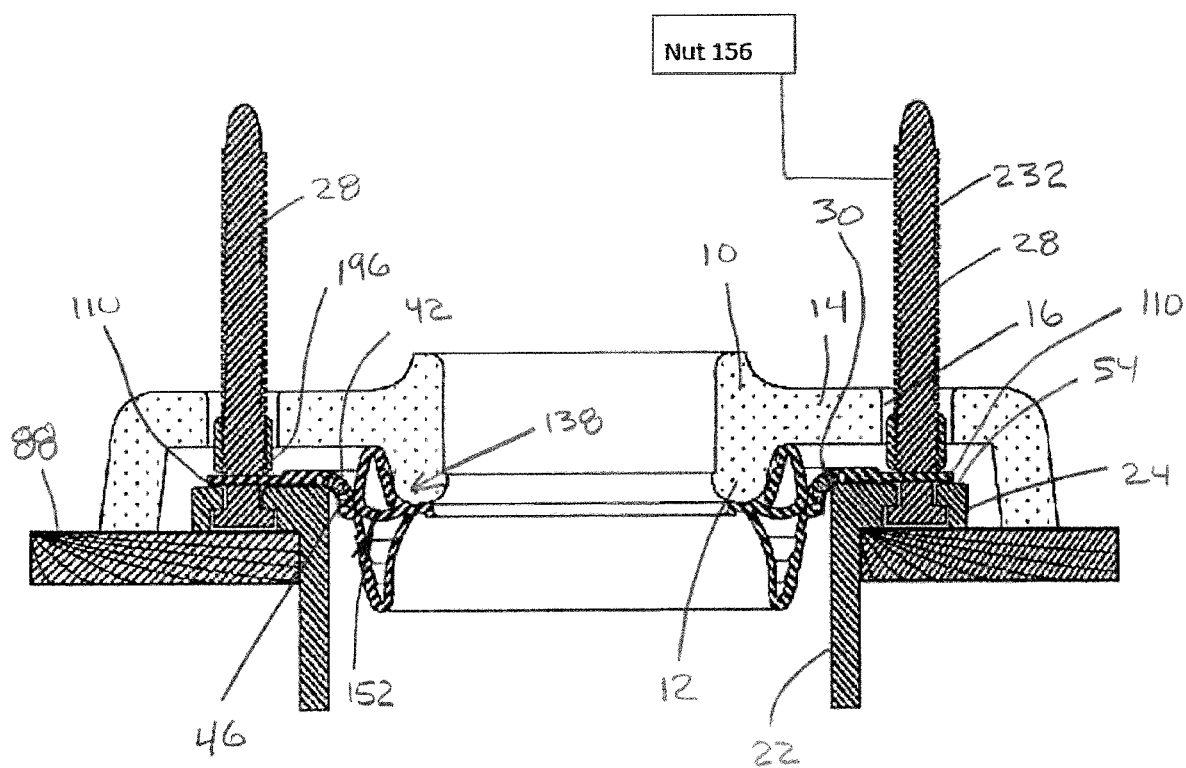
FIG. 21 is a cross-sectional view as in FIG. 20 of a toilet lowered to a fully mounted position on a support surface whereupon a body on the sealing assembly is changed from the starting state of FIG. 20 into a final state.

While there could be a different dedicated structure, in this embodiment, the sleeve 34 has integrally formed, diametrically opposite tabs 110, each of which accepts securing components, performing the function of those identified at 66 in FIG. 5—in this embodiment in the form of anchor bolts 28 as shown schematically in FIG. 1 and in one exemplary form in FIG. 21. The anchor bolts 28 thus perform their normal anchoring function and additionally confine radial movement of the mounting flange 42 relative to the flange surface 54.

In the form depicted, additional diametrically opposite tabs 112 are provided, as to accommodate fasteners associated with a repair structure, as described below.

The sealing component 46 has a thin, flat, ring shape and has at least a portion thereof that resides between the axially downwardly facing surface 52 on the mounting flange 42 and the upper flange surface 54.

As depicted, the sealing component 46 also extends radially across the annular outer corner 30 on the closet collar 22.

The force transmission region 40 of the body 36 has an annular wall 114 with a non-uniform radial thickness between a top region at 116, that transitions into the horn engaging region 38, and a bottom region at 118, that transitions into the mounting flange 42. The diameter of the wall 114 increases progressively from the top region 116 to the bottom region 118 thereof.

The wall 114 has a plurality of axially spaced annular regions with different radial thicknesses. The wall 114 has a plurality of radially outer annular steps and a plurality of radial inner annular steps that face axially oppositely and respectively define reinforcing ribs 120, 122. This construction tends to maintain a substantially symmetrical shape of the force transmission region 40 as it is collapsed in a vertical direction under a downward force generated by the toilet 10, as it is lowered. The radial thickness of the wall 114 is controlled so that the lower region thereof adjacent to the mounting flange 42 is more readily axially collapsible than the region thereabove. The more flexible lower region will collapse and bend with a hinging action, as shown in FIG. 21, before the more rigid upper wall region appreciably deforms under the weight of the lowering toilet 10.

The horn engaging region 38 has a top 124 and bottom 126. The top 124 is defined by an inturned flange 127 bounding an entry opening 128. An annular outer wall 130 on the horn engaging region 38 has a diameter that decreases progressively from the top 124 to the bottom 126 thereof.

The bottom 126 of the horn engaging region 38 and the top region 116 of the wall 114 on the force transmission region 40 meet at a transition region 132 at which there is an axially facing, annular pushing portion 134, which is rigidified by a depending annular bead 136.

As seen at FIG. 21, the toilet horn 12 has a bottom region 138 that will, during the process of lowering the toilet to its mounting position, bear against the axially facing pushing portion 134 to transfer a downward force to the annular force transmission region 40.

An exemplary mounting procedure for the toilet will now be described utilizing the sealing assembly 32, including the sealing component 46.

As seen in FIG. 20, the closet collar 22 is fixed in relationship to the support surface 88 at which an inlet 140 on the drain pipe 20 is exposed. With the closet collar 22 fixed, the flange 24 extends around the drain pipe inlet 140, as viewed from above.

The toilet horn 12 is aligned over the axis 50 of the fixed closet collar flange with the sleeve body 36 in the starting position and starting state of FIG. 20. In the starting position, the axis 48 of the body 36 is generally aligned with the axis 50 of the flange 24.

The toilet 10 is then lowered, whereupon the bottom horn region 138 engages the flange 124 and progressively bends the flange 124 axially downwardly until the flange 124 wraps compressibly, sealingly against an outside peripheral surface 142 on the bottom horn region 138 to establish at least a preliminary sealing connection thereat.

Figure 24:
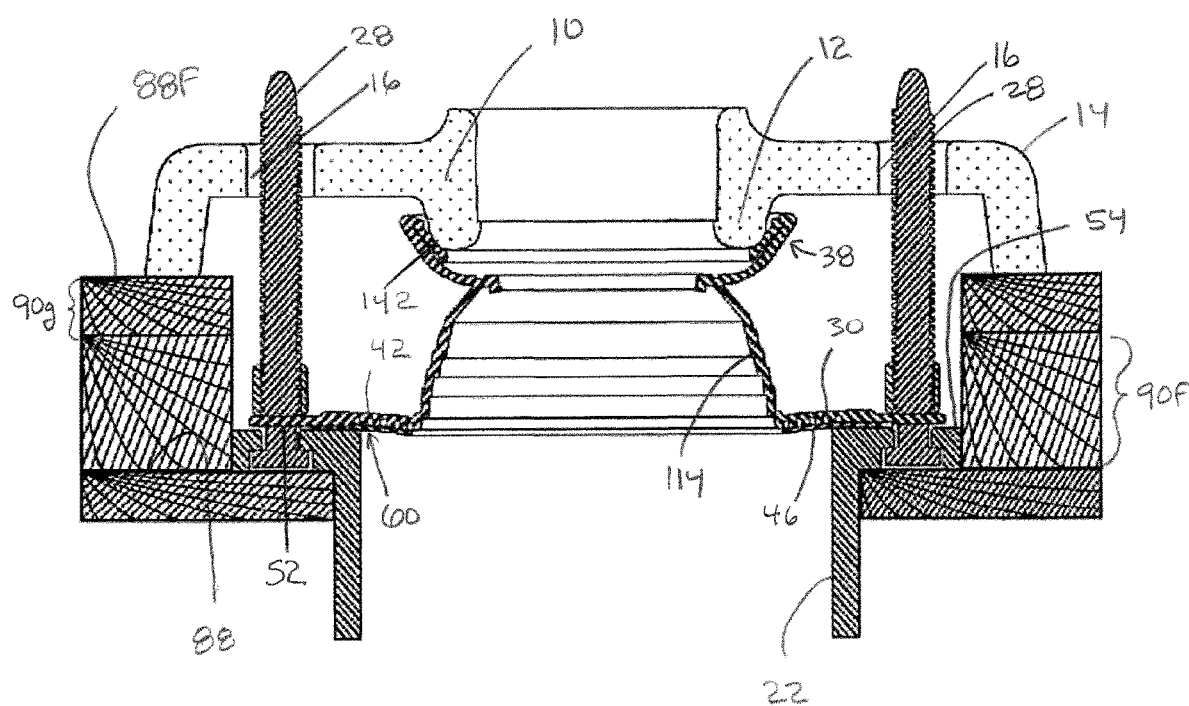

Continued downward movement of the toilet horn 12 causes the bottom horn region 138 to engage the pushing portion 134 at the transition region 132. This in turn produces a compressive force upon the top of the force transmission region 40. Under initial force transmission at a predetermined level, the compressive forces in the force transmission region 40 cause the mounting flange 42 to bend so as to wrap against the annular outer corner 30, as seen in FIG. 24.

Figure 23:
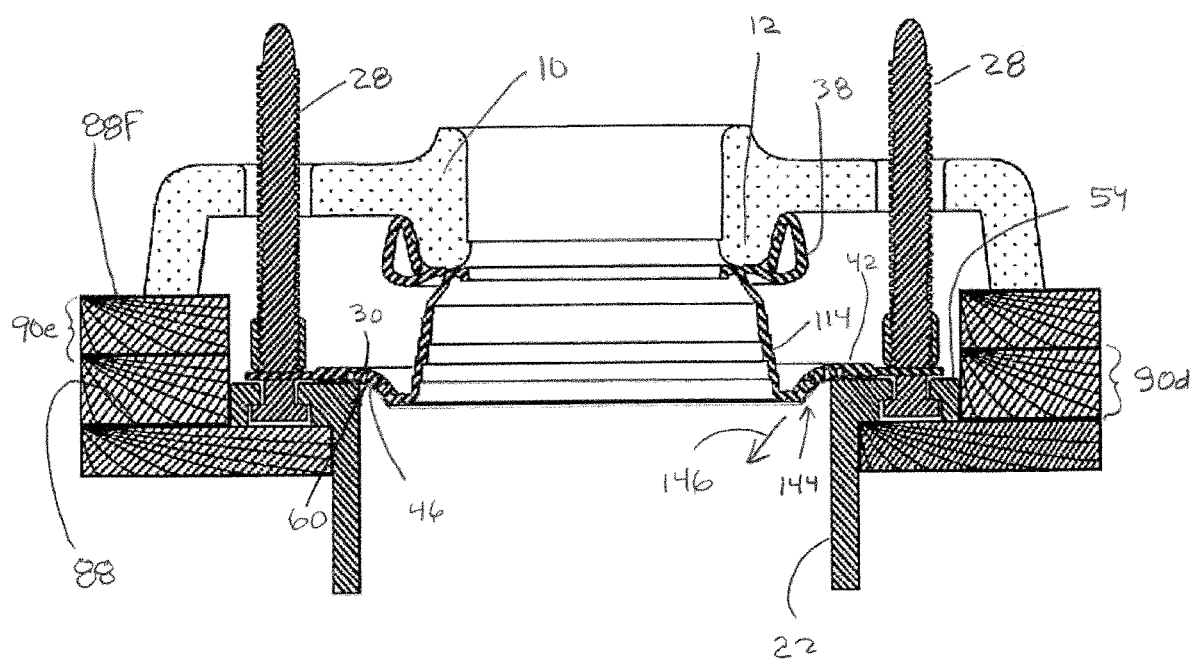
FIGS. 23-25 correspond to FIGS. 21 and 22 and show the body on the sealing assembly in three different final states with the toilet mounted on a redefined support surface built up from the original support surface to different heights, increasing from FIG. 23 to FIG. 25.

Continued downward movement of the toilet 10 eventually causes the more collapsible lower region of the wall 114 to fold further around itself, as shown in FIG. 23. As this occurs, the part of the lower annular wall region identified at 144 in FIG. 23 is placed in tension so as to thereby exert a force in the direction of the arrow 146 that draws the annular region 60 of the downwardly facing surface 52 with a greater wrapping force against the corner 30.

Figure 22:
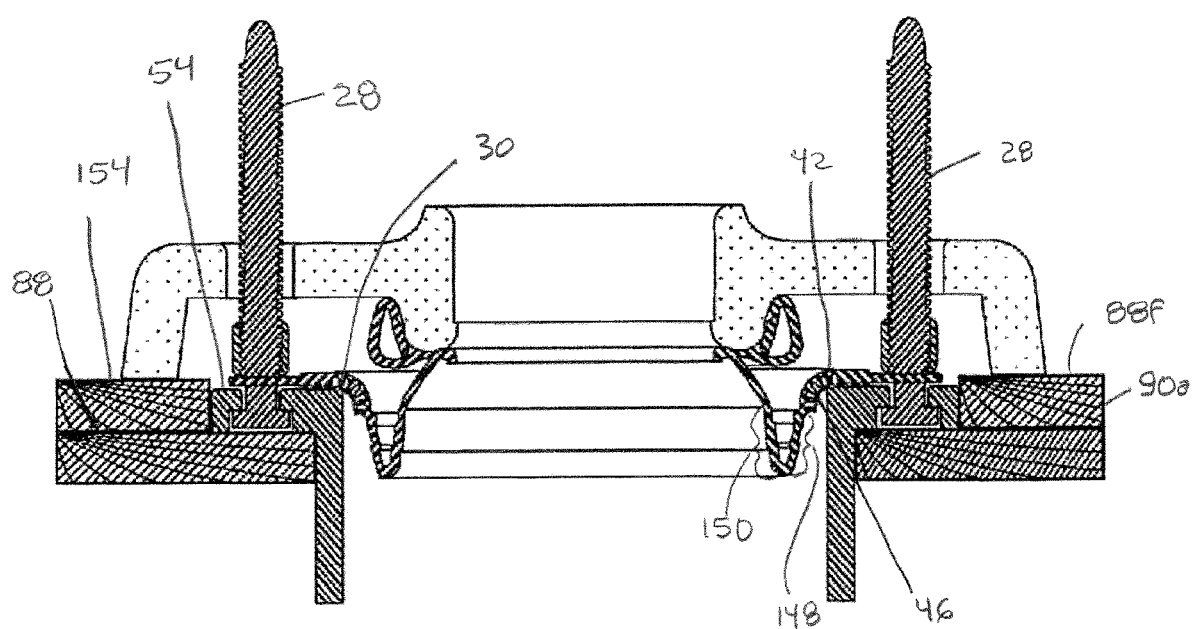
FIG. 22 is a view as in FIG. 21 wherein the original support surface is built up to a first thickness around the closet collar flange, the toilet is in a fully mounted position with respect to a redefined support surface, and the body on the sealing assembly is in a different final state than in FIG. 21.

Further downward movement of the toilet 10 continues to generate the tensile force on an axial length 148 at the lower region of the wall 114 that is in axially overlapping relationship with another axial length 150 of the wall 114, with the axial length 150 being radially inside of the axial length 148, as shown in FIG. 22. This further bears the wrapped mounting flange surface 52 against the corner 30.

In one final state for the sleeve body 36, as shown in FIG. 21, a part of the horn engaging region at 152 is urged against the bent mounting flange 42 so as to thereby further urge the annular region of the downwardly facing surface 52 into wrapped engagement with the corner 30.

While the sleeve body 36 has been described in FIG. 20 to be in a starting state and in FIG. 21 to be in a final state, in actuality, the sleeve body 36 is designed to assume different final states (additional final states shown in each of FIGS. 22-24) depending upon the vertical relationship between the upper surface 54 of the flange 24 and the final support surface 88. Transition between the FIG. 20 starting state and the FIG. 21 final state for the body 36 occurs when the bottom 82 of the flange 24 is abutted directly to the support surface 88.

With the FIG. 22 site condition, the aforementioned layer 90a is placed over the original support surface 88 whereby the upper flange surface 54 is slightly beneath the top surface 154 of the layer 90a which defines the final support surface 88f. Accordingly, the sealing assembly 32 is not required to collapse fully to the FIG. 21 state. However, the reconfigured sleeve 34 in FIG. 22 still causes the annular region of the downwardly facing surface 52 to be wrapped against the outside corner 30 with a substantial sealing force.

In FIG. 23, components/layers 90d, 90e are stacked against the original support surface 88 to produce an even greater spacing between the flange surface 54 and the final support surface 88f for the toilet 10.

The sleeve 34 is constructed so that with the FIG. 23 site condition, the horn engaging region 38 seals effectively around the horn 12 while the portion of the wall 114 in compression generates a bending force on the mounting flange 42 that causes the annular portion 60 of the downwardly facing surface 52 to be wrapped against the annular outer corner 30 to effect an adequate seal thereat.

With the FIG. 24 site condition, the stacked components/layer 90f, 90g placed upon the original floor surface 88 produce an even greater gap than in FIG. 23 between the upper flange surface 54 and the redefined and final support surface 88f for the toilet 10.

With the sleeve body 36 in this final state, the horn engaging region 38 effectively seals around the horn 12 while at the same time the wall 114, under compression induced by the lowering toilet 10, produces a bending force on the annular portion 60 of the downwardly facing surface 52 on the mounting flange 42 to a degree that a sufficient wrapping force is generated to effect a positive seal.

As noted previously, the sealing of the mounting flange 42 can be done with or without the sealing component 46, With the sealing component 46, as the mounting flange 42 is bent/wrapped, it causes the portion of the sealing component 46 underlying the mounting flange 42 to be forcibly wrapped directly against the outside corner 30 of the closet collar.

As seen in FIGS. 21-24, the anchor bolts 28 extend through openings 16 on the mounting portion 14 of the toilet whereupon they can be engaged by a nut 156 (FIG. 21) to secure the toilet in its final mounting position.

In FIGS. 25-30, the sealing assembly 32 is shown cooperating between the toilet 10 and the closet collar 22" with various site conditions corresponding generally to those shown in FIGS. 21-24, wherein the vertical distance between the upper surface 54" on the closet collar flange 24" and the final support surface 88*f* for the toilet 10 changes through a range. The axial spacing between the surfaces 54", 88*f* increases progressively with the site conditions in FIGS. 25-29.

Figure 30:
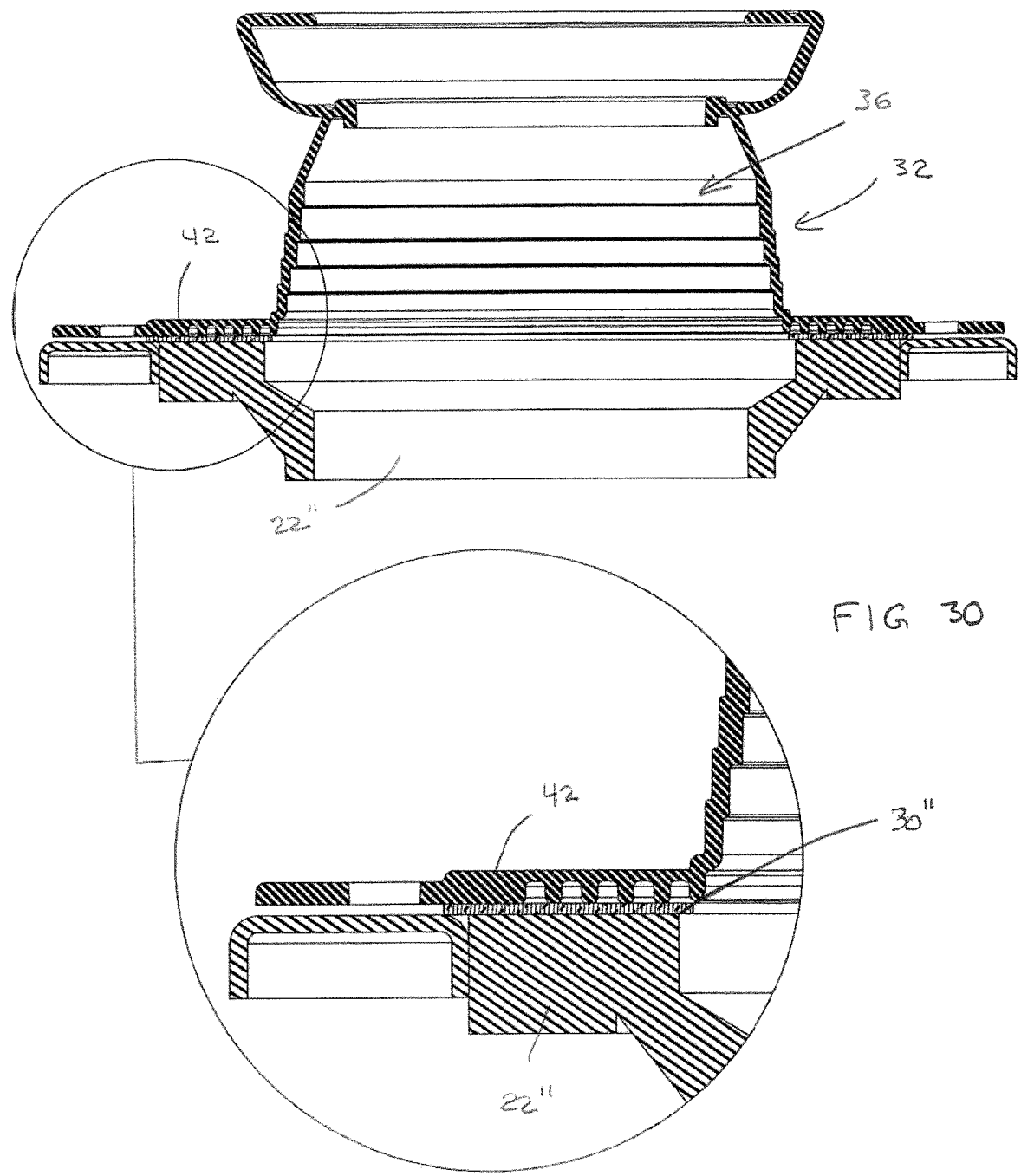
FIG. 30 is a cross-sectional view of the sealing assembly as in FIG. 20 and atop the closet collar in FIG. 10.
Figure 31:
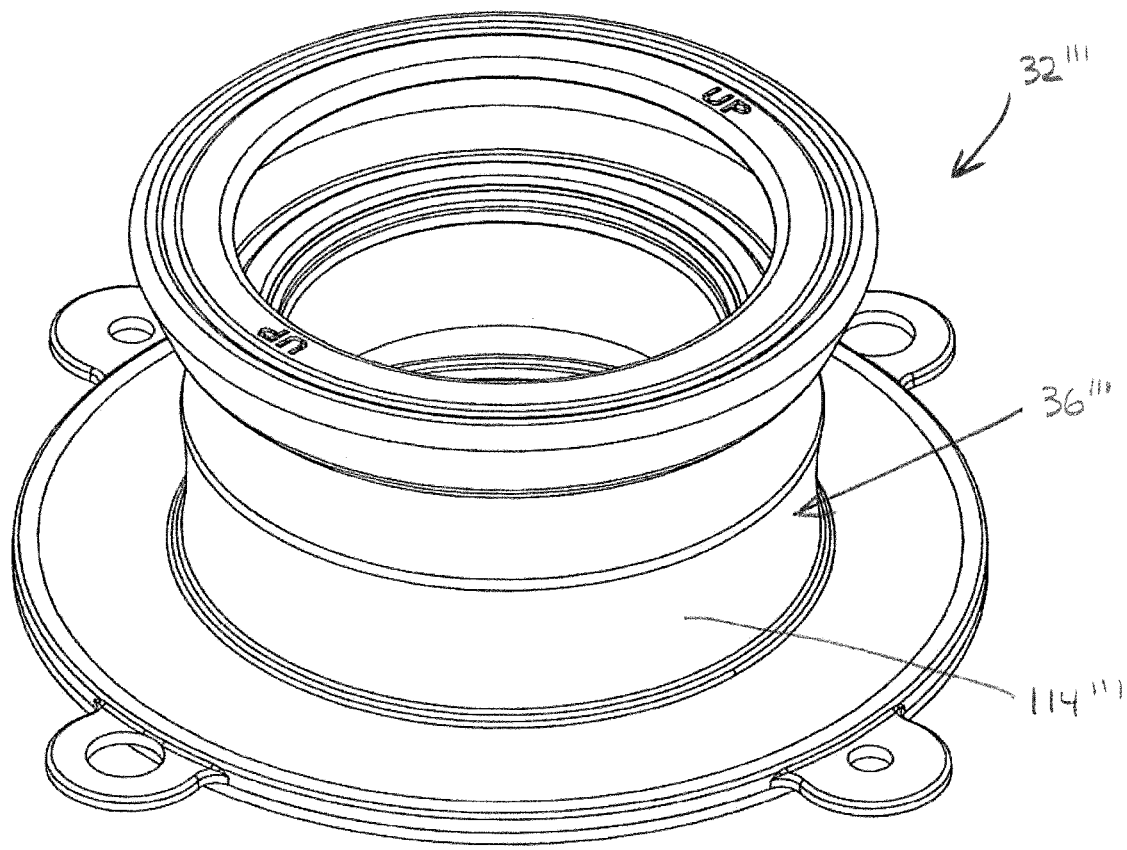
FIG. 31 is a view as in FIG. 16 of a modified form of sealing assembly, according to the present invention.
Figure 32:
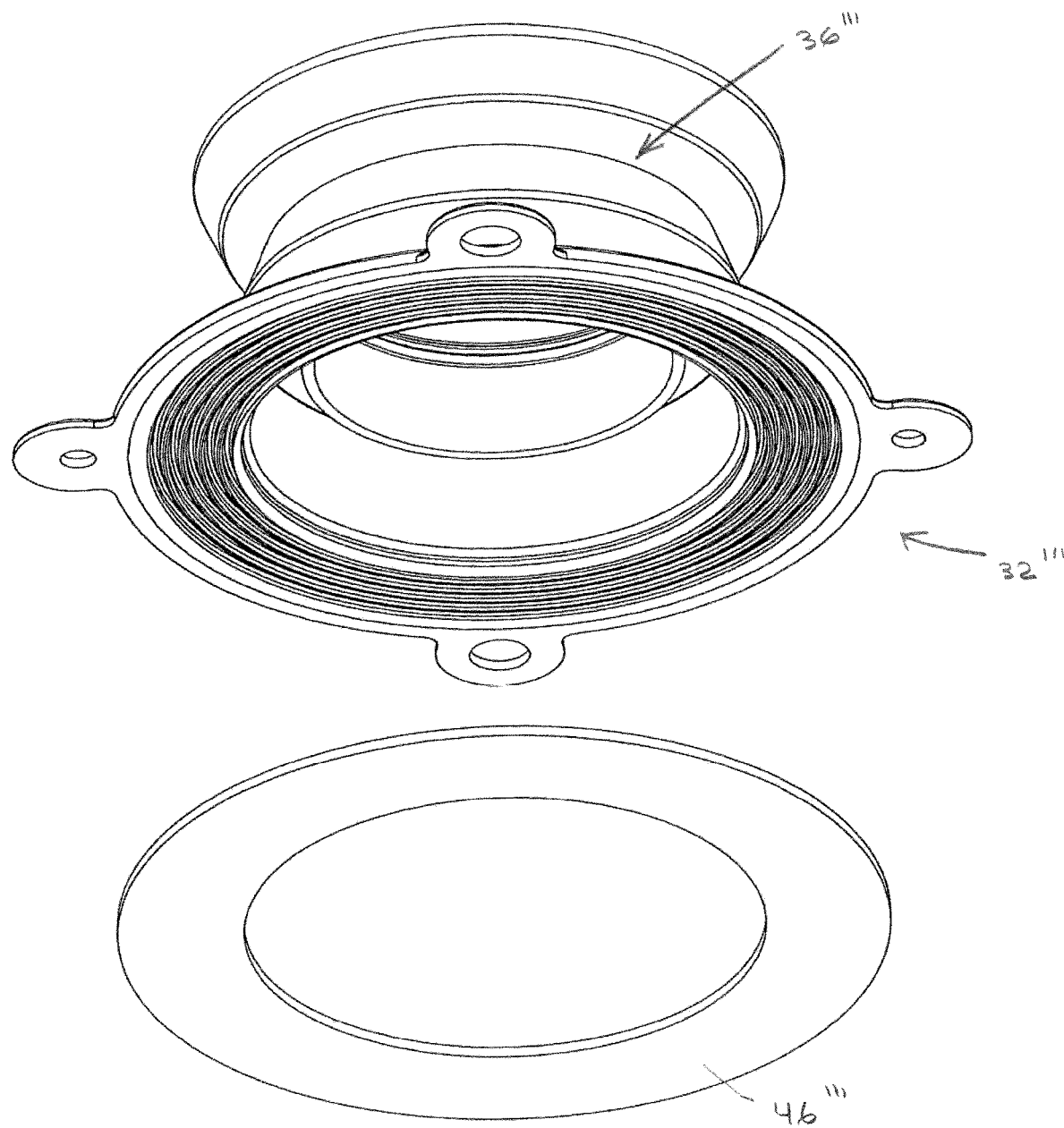
FIG. 32 is an exploded perspective view of the sealing assembly in FIG. 31.
Figure 35:
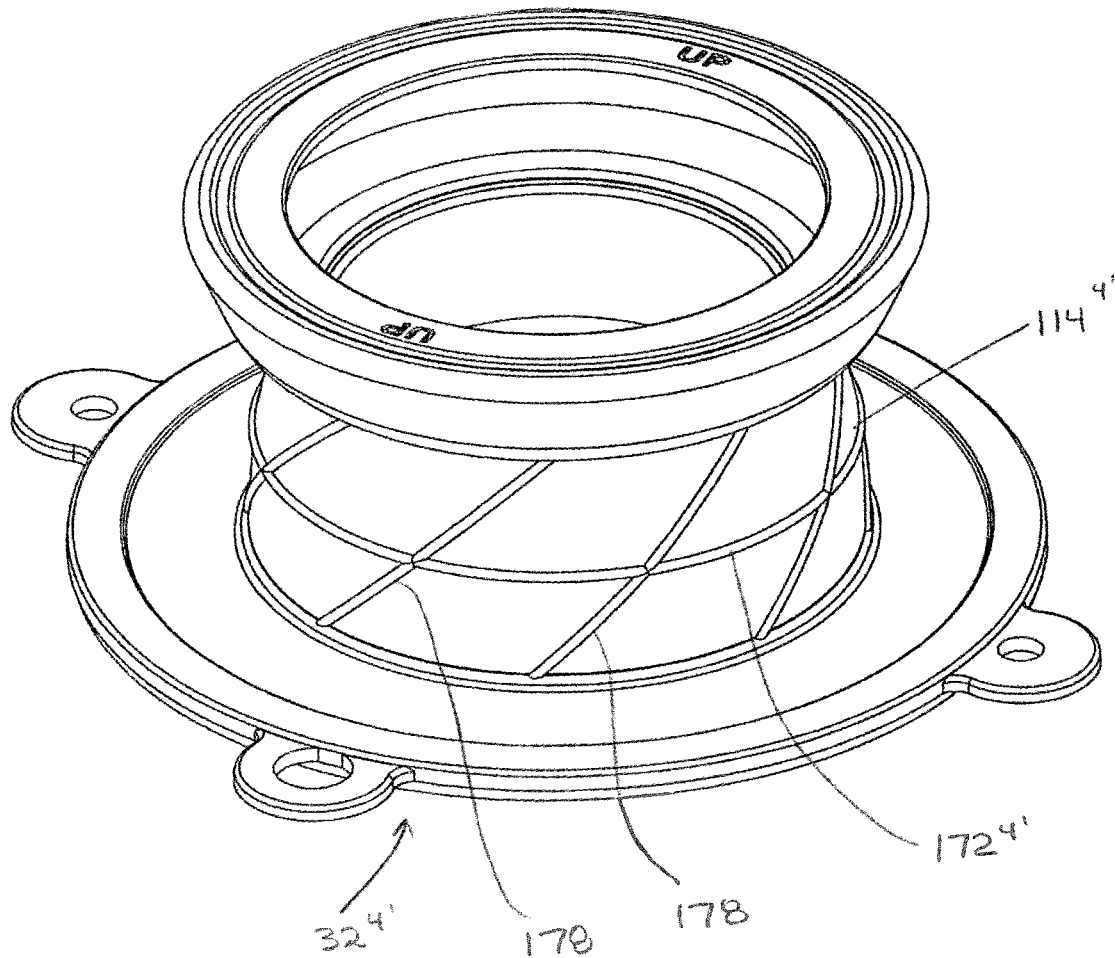
FIG. 35 is a view as in FIGS. 16 and 31 of a further modified form of sealing assembly, according to the present invention.
Figure 36:
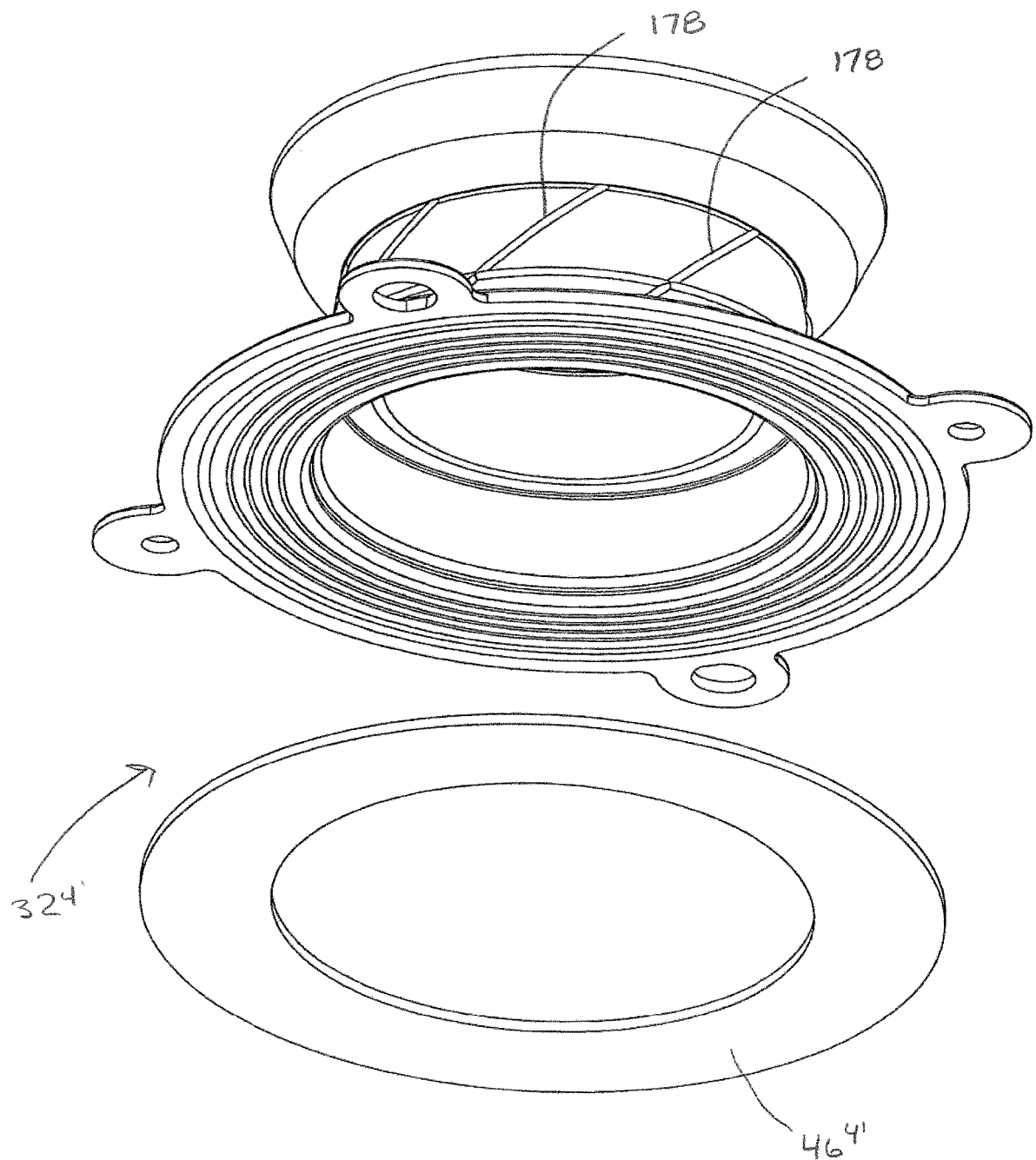
FIG. 36 is an exploded perspective view of the sealing assembly in FIG. 35.
Figure 37:
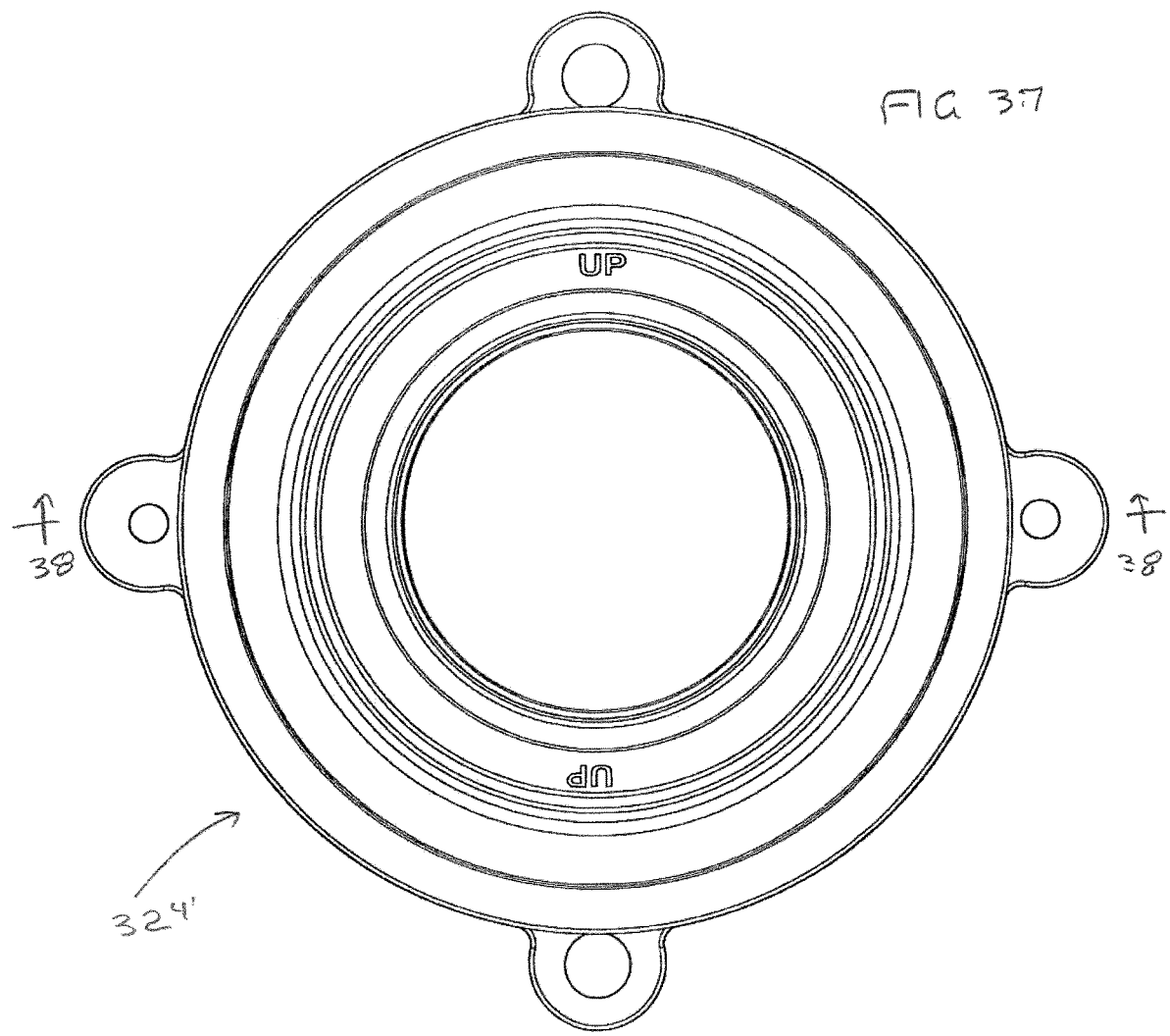
FIG. 37 is a plan view of the sealing assembly in FIGS. 35 and 36.
Figure 38:
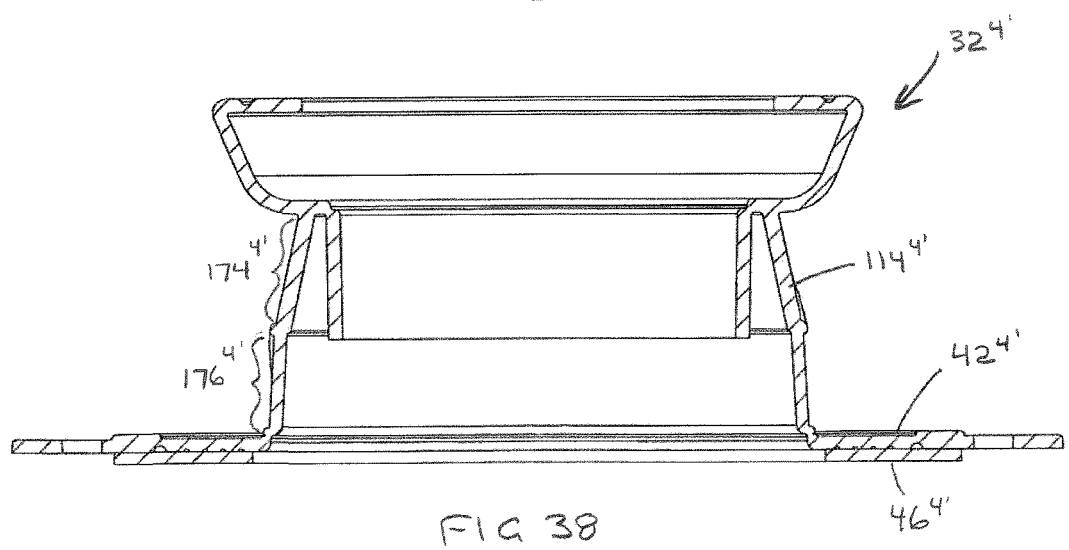
FIG. 38 is a cross-sectional view of the sealing assembly taken along line 38-38 of FIG. 37.

In FIG. 30, the sleeve body 36 is shown in a starting position and a starting/relaxed state, corresponding to that in FIG. 20, but atop the closet collar 22" rather than the closet collar 22. Because the closet collar 22" has a smaller diameter than the closet collar 22, the mounting flange 42 projects radially inwardly past the annular outside corner 30" to a lesser degree.

Figure 29:
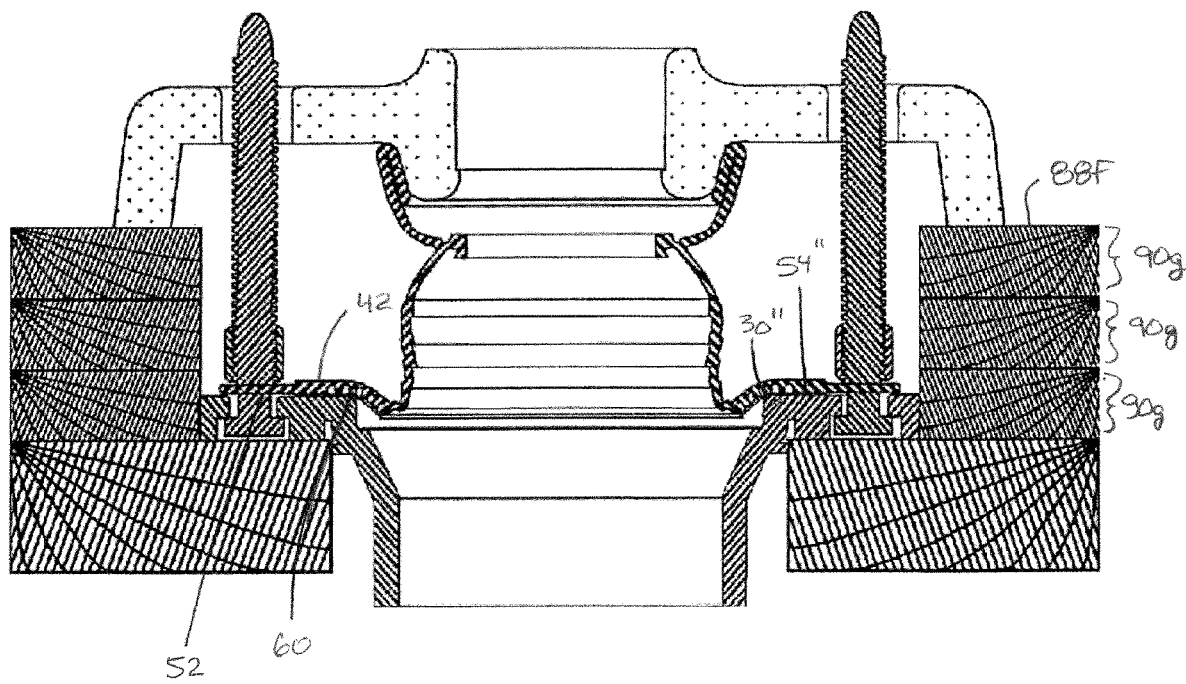

The FIG. 29 site corresponds to that in FIG. 24 and shows three components/layers 90*g* stacked on the original support surface 88, which components/layers 90*g* define a final support surface 88*f* that is slightly further above the upper flange surface 54" than the surface 88 is spaced from the upper flange surface 54 in FIG. 24.

With the sleeve body 36 in the final state of FIG. 29, there is thus a slightly lesser axial collapsing of the wall 114. However, the annular region 60 of the axially downwardly facing surfaced 52 of the mounting flange 42 is adequately forcibly wrapped against the annular outside corner 30" to produce an effective seal thereat.

In this final state, the body 36 cooperates with the closet collar 22" in substantially the same way that the body 36 cooperates with the closet collar 22.

Figure 28:
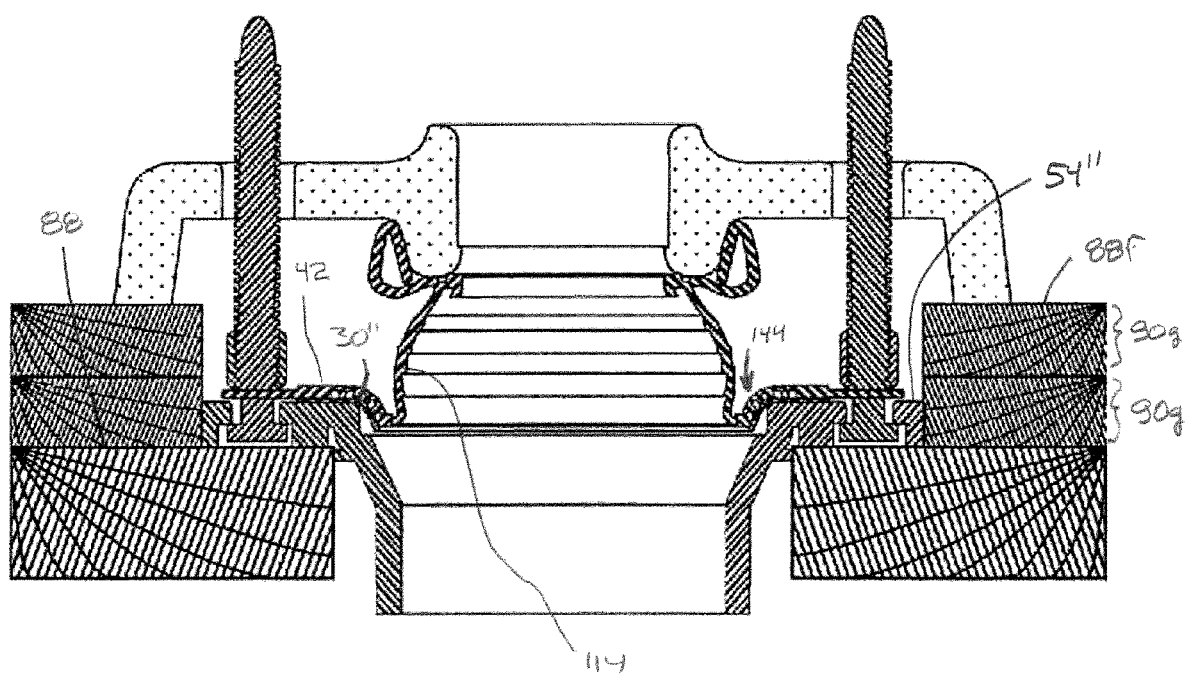

In FIG. 28, two components/layers 90*g* are stacked on the original support surface 88 whereby the vertical spacing between the upper flange surface 54" and redefined/final support surface 88*f* is less than the corresponding distance in FIG. 29. The lower region of the wall 114 hinges around itself to a greater degree whereby the region 144 is placed under greater tension to enhance the wrapping force of the annular portion 60 of the downwardly facing surface 52 against the corner 30". With the sleeve body 36 in the final state of FIG. 28, the cooperation between the sealing assembly 32 and the closet collar 22" is substantially the same as the cooperation between the sealing assembly 32 and the closet collar 20 with a generally similar site condition—recess of the upper flange surface 54" beneath the support surface 88.

Figure 27:
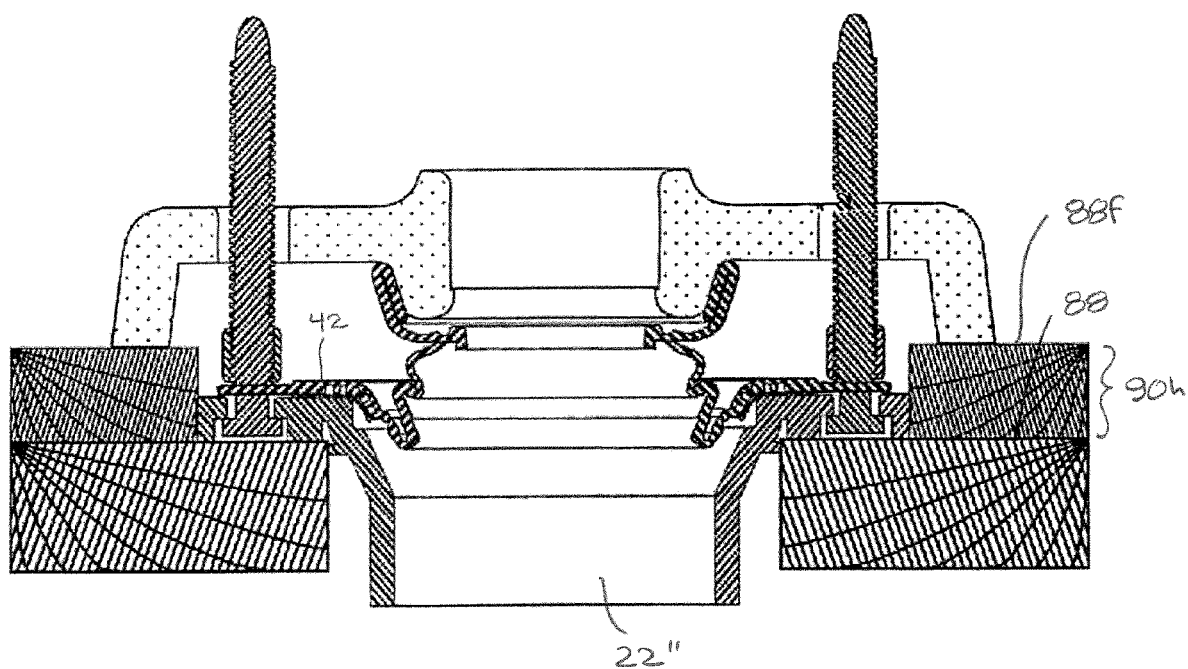

In FIG. 27 a component/layer 90*h* is placed on the original support surface 88, thereby producing a spacing between the upper collar surface 54 and the redefined, final support surface 88*f* that is less than the vertical spacing between the corresponding surfaces in FIG. 28.

Again, the interaction between the sealing assembly 32 and the closet collar 22" is substantially the same as the cooperation between the sealing assembly 32 and the closet collar 22 with the sleeve body 36 in substantially the same final state.

Figure 26:
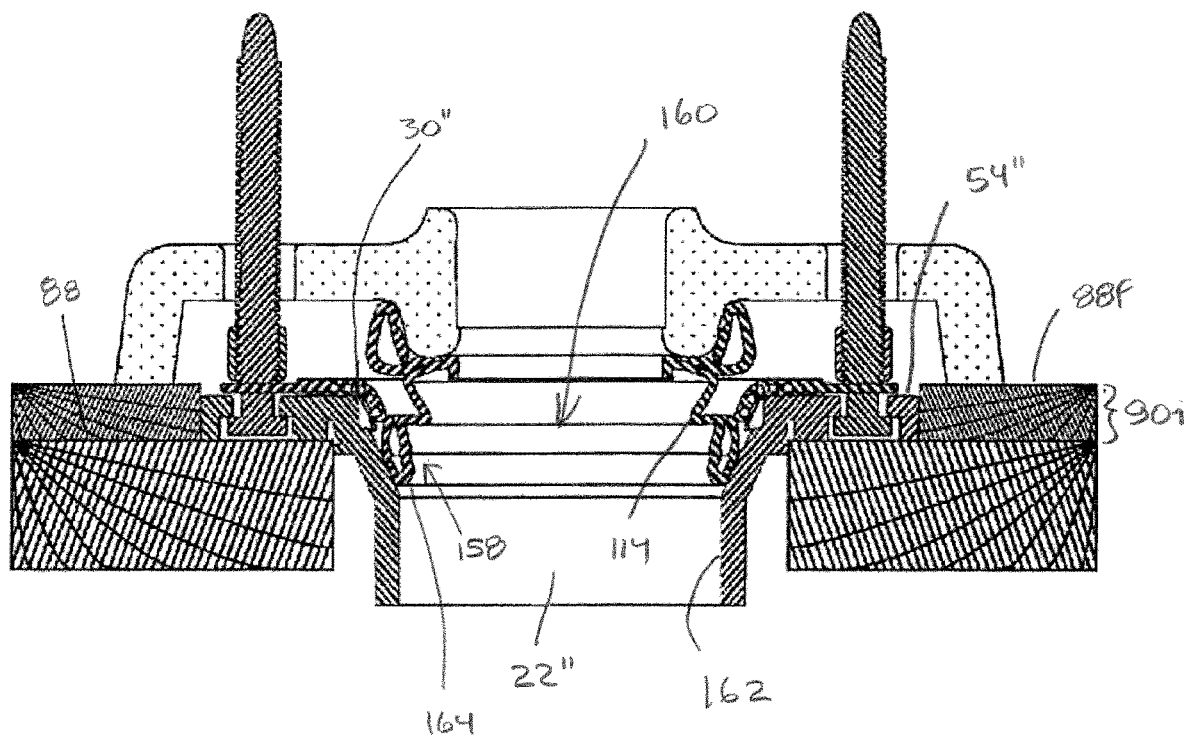
FIGS. 26-29 correspond generally to FIGS. 21-25 and show a toilet fully mounted with an upper surface of a closet collar flange at different heights relative to a redefined support surface for the toilet and with the sealing assembly in FIGS. 21-25 utilized in association with the closet collar in FIG. 10.

In FIG. 26, a single component/layer 90*i* is placed on the original support surface such that the upper flange surface 54" is slightly below the redefined, final support surface 88*f* on the component/layer 90*i*.

With the sleeve body 36 in the final state in FIG. 26, the wrapping action against the outside corner 30" is increased by reason of the maintained tensile force produced on the mounting flange 42 by the collapsing wall 114. Additionally, the folded wall portion 158 is pressed against a funnel shaped surface portion 160 making up an axial length of the stepped diameter surface bounding a through passage 162 on the closet collar 22".

The folded wall portion 158, which has radially stacked wall thicknesses, has a relatively thin radial dimension and maintains adequate flexibility that this wall portion 158 does not act as a wedge to maintain the toilet spaced above the floor surface 88*f*, nor does it substantially reduce the diameter of the opening at the bottom edge 164 of the wall portion 158 that produces a drip line below the flange surface 54".

Figure 25:
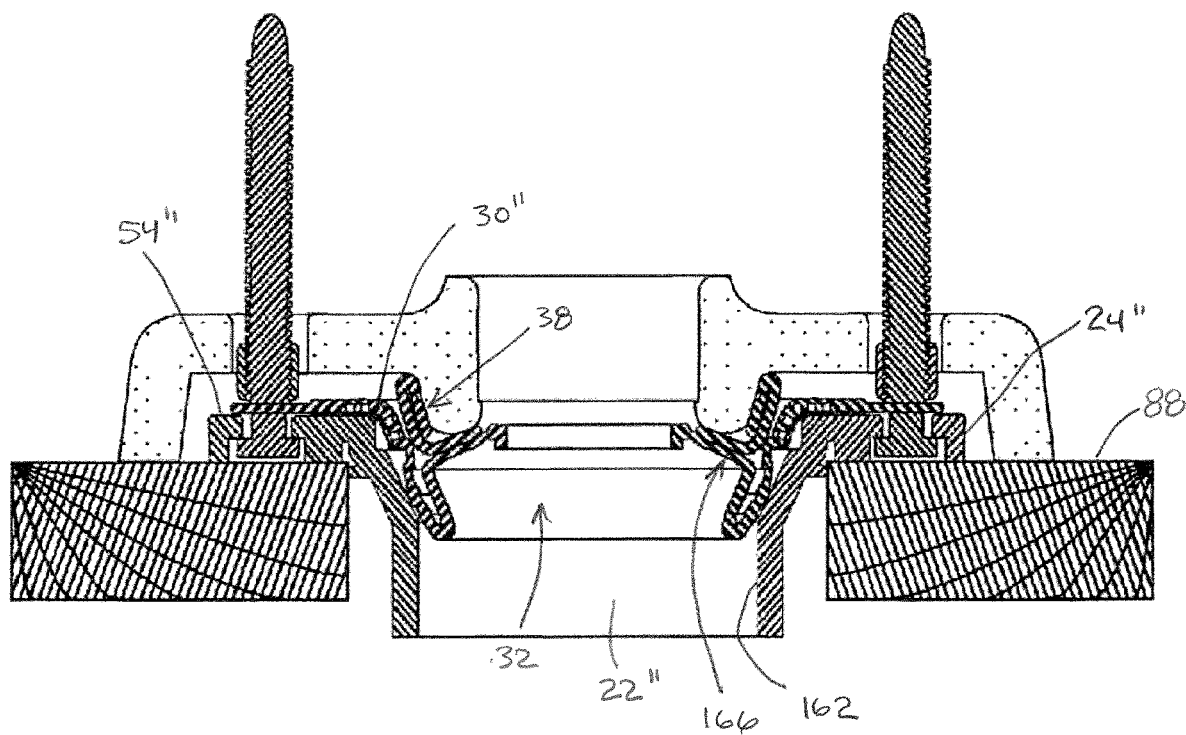

With the FIG. 25 site condition, the closet collar flange 24" is placed directly upon the original floor/support surface 88 whereby the upper flange surface 54" is above the support surface 88.

With the toilet 10 lowered to place the sleeve body 36 in its final state in FIG. 25, an axial length of the wall 114 at 166 folds upwardly and outwardly toward the horn engaging region 38 and into a vacant volume, thereby avoiding a wedging condition wherein the accumulated portions of the wall 114 might otherwise tend to maintain the toilet 10 above the support surface 88 therefor.

With the FIG. 25 site condition, the collapsed sleeve body 36 strategically moves into an available volume defined by the funnel-shaped surface 160, and the region thereabove, so as not to either create a significant obstruction to lowering of the toilet 10 to its fully mounted position or appreciably restrict the flow path diameter from the horn 12 to the drain pipe 20. If the foot of the toilet was shorter, the seal would still have room to compress fully in the funnel shape without holding the toilet off the finished floor.

The strategic provision of the radially oppositely projecting reinforcing ribs 120, 122 reinforces the wall 114 so that it tends to collapse while maintaining a generally symmetrical shape around its axis and generates a substantially uniform sealing force at locations, including and primarily, at the annular outside corners 30, 30". At the same time, because of forces built up in the body 36 through its deformation, a constant, resilient, wrapping sealing force is maintained by the annular portion 60 of the downwardly facing surface 52 at the outside corners 30, 32 with sealing forces maintained as well at other locations, depending upon the final state, as dictated by the site conditions.

The stepped arrangement and controlled radial thickness of the wall 114 also permits a compact radial collapsing of the wall 114, particularly at locations where the wall 114 is doubled back against itself. The reinforcement of the wall 114 through the ribs 120, 122 permits use of a relatively thin wall construction, resulting in a relatively compact folded volume. The collapsed wall 114 may be thin enough that even when stacked, it may flex to seek on available volume, which avoids unwanted wedging.

With the sleeve body 36 in the final state of FIG. 21, the top horn engaging region 138 is urged against the radially outwardly projecting mounting flange 42 so as to thereby urge a part of the annular region 60 of the mounting flange surface toward the outside corner 30 of the closet collar 22.

With the above described sleeve assembly construction, a single configuration may accommodate both closet collars 22, 22" and other closet collar configurations, including ones with different diameters. What is desirable is that the annular region 60 of the downwardly facing surface 52 on the mounting flange 42 project across the corner 30, 30" so that this region can be wrapped thereagainst. As seen with the closet collar 22', the annular region extends to a lesser degree radially inwardly from the outside corner 30", but adequately that it will bend under the weight of the toilet 10 to produce the necessary wrapping and sealing action.

The sealing at the outside corners 30, 30" can be effected with a relatively thin layer of material. In the event that the separate sealing component 46 is utilized, a thin layer of foam, rubber, or other flexible and stretchable material, can be utilized.

Since the sealing region between the sealing assembly 32 and outside corner 30, 30" is annular, the sealing assembly 32 tends to self-center with respect to the closet collar flange 24, 24". This centering action is further enhanced by reason of the fact that a portion of the mounting flange 42 is bent into the region below the upper flange surface 54, 54", which at a certain level of deformation produces a male shape that fits snugly within the closet collar at the radial inside region of the closet collar flange.

With a substantially centered sealing assembly 32, a generally uniform sealing pressure can be provided at the outside corners 30, 30", and elsewhere where there is connection between the sealing assembly sleeve 34, the respective closet collar, and the toilet 10. Because part of the sealing assembly body 36 is placed in compression and part in tension once the final state therefor is realized, a constant biased sealing connection is maintained by residual forces in the sleeve body 36 once the toilet 10 is in its fully mounted position.

At the same time, the sealing assembly 32 can be made so that the sleeve 34 can be separated after an installation and will remain intact and reassume its starting state to be usable in a subsequent mounting procedure.

As briefly mentioned above, by reason of including the radial steps that produce internal and external ribs 120, 122, the overall shape of the body 114 can be generally maintained as it is compressed under forces that may not be uniform around the vertical axis of the body 36 as the toilet 10 is lowered.

The controlled thickness of the wall 114 facilitates the controlled serial collapsing of axially spaced, annular portions of the wall 114 to allow the desired final states for the body 36 to be realized.

In an alternative design, the ribs 120, 122 produced by the steps may be hollow so that the wall 114 may collapse more compactly with the body 36 in its final state.

Numerous variations of the above structures are contemplated within the generic depictions in FIGS. 2-5, with those described below being exemplary in nature only.

In FIGS. 31-34, a modified form of sealing assembly is shown at 32'''. The sealing assembly 32''' differs from the sealing assembly 32 primarily in two respects.

First, the sealing assembly 32''' has a sleeve body 36''' that has a wall 114", corresponding to the wall 114 on the sealing assembly 32, and additionally has an integral funnel body 168 in axially overlapping relationship with the wall 114", with a portion 170 of the wall 114''' in axially overlapping relationship with the wall 114''' and spaced radially therefrom.

Additionally, as opposed to having ribs 120, 122 produced by multiple steps, the wall 114" has a single, outwardly projecting portion/rib 172 that extends around the axis 48" of the body 36''' and stabilizes the shape of the wall 114' during installation and divides the wall 114''' into axially spaced upper and lower regions 174, 176, respectively. The greater axial extent of the lower region 176 makes it inherently more readily collapsible under axial force, assuming the thicknesses of the regions 174, 176 are the same or similar.

The wall thickness might also be varied to further facilitate the controlled collapsing of the wall 114''' during assembly to allow the sealing assembly 32''' to positively seal with respect to a closet collar in different final states, generally as described above for the sealing assembly 32.

The mounting flange 42''' may be configured substantially the same as the mounting flange 42 to cooperate with an outside corner 30, 30" to effect sealing thereat in the same manner as is accomplished through the mounting flange 42.

An optional sealing component 46''' cooperates with the closet collar 22, 22" the same as the sealing component 46 cooperates therewith, under the force applied through the reconfigured mounting flange 42''' during installation.

In FIGS. 35-38, a further modified form of sealing assembly, according to the invention, is shown at 32$^{4\prime}$. The sealing assembly 32$^{4\prime}$ is similar to the sealing assembly 32''' and differs primarily in terms of the construction of the wall 114$^{4\prime}$.

In addition to having a rib 172$^{4\prime}$ corresponding to the rib 172, the wall 114$^{4\prime}$ has circumferentially spaced ribs 178 extending in substantially matching, spiral paths. The arrangement of the ribs 178 affords additional reinforcement and also potentially reduces the stacking of rib thicknesses as the wall 114$^{4\prime}$ is collapsed during installation.

As a further difference, an upper region 174$^{4\prime}$ of the wall 114$^{4\prime}$ is thicker radially than a lower region 176$^{4\prime}$ thereof, whereby the lower region 176$^{4\prime}$ is more readily axially collapsible than the upper region 174$^{4\prime}$ and the sequence of collapsing and folding can be controlled similarly to the collapsing of the walls in other embodiments herein.

The mounting flange 42$^{4\prime}$ may be substantially the same as the mounting flange 42 with an optional sealing component 46$^{4\prime}$ usable in association therewith to create a wrapped sealing arrangement at the closet collar outside corners 30, 30".

Figure 39:
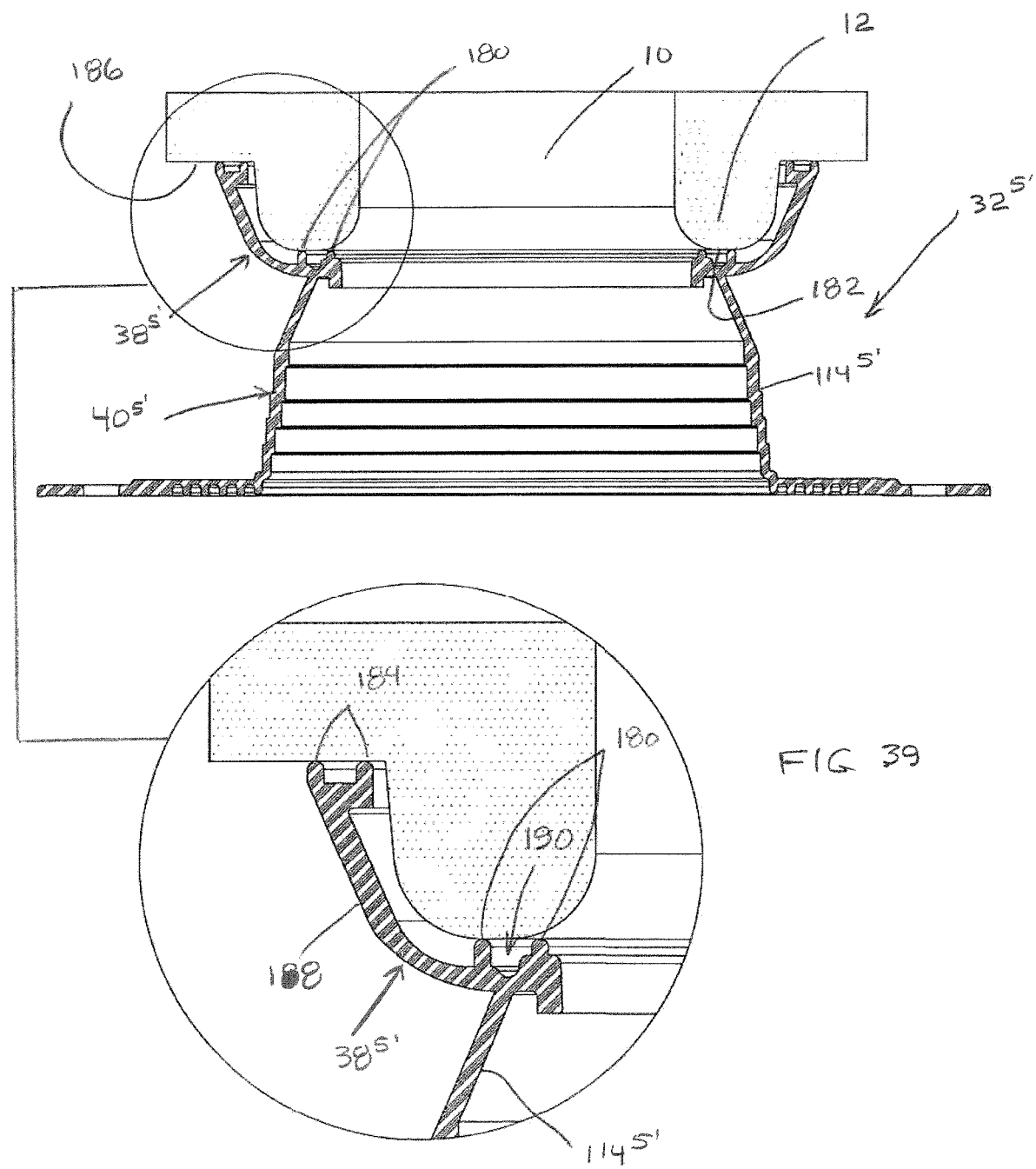
FIG. 39 is a cross-sectional view, corresponding to that in FIG. 38, of a further modified form of sealing assembly, according to the invention, and in relationship to a bottom portion of a toilet.

A further modified form of sealing assembly is shown at 32$^{5\prime}$ in FIG. 39. The primary modification to the sealing assembly 32$^{5\prime}$ is in the area of the horn engaging region 33$^{5\prime}$.

In this embodiment, concentric, upwardly projecting rings 180 cooperatively produce a seat for a rounded bottom surface 182 on the toilet horn 12. In addition to providing a seal at the contacting location, the rings 180 assist in positively and stably transferring a downward force from the lowering toilet 10 to the top of the force transmission region 40$^{5\prime}$. The rings 180 tend to maintain the round shape of the sleeve wall 114$^{5\prime}$ at the top of the force transmission region 40$^{5\prime}$.

An additional arrangement of concentric rings 184 is provided at the top of the horn engaging region 38$^{5\prime}$. The rings 184 bear against an underside toilet surface 186 to create a redundant seal thereat. The rings 184 also tend to rigidify the top of the horn engaging region 38$^{5\prime}$ which is not required to collapse to seal against the toilet 10. A wall 188 on the horn engaging region 38$^{5\prime}$ has a thickness that varies from top to bottom, with the lower region thinner to flex and accommodate deformation of the wall 114$^{5\prime}$ during an installation.

The region at 190 between the rings 180 is shaped irregularly to produce locally reinforced regions that likewise resist changing of the round shape of the top of the wall 114$^{5\prime}$ during an installation.

As seen in FIG. 40, the sealing assembly 32$^{5\prime}$ can be used in conjunction with a ring-shaped sealing component 192 that may be supported upon the rings 180 such that the upper surface 194 on the sealing component 192 bears against the horn surface 182 as the toilet 10 is lowered towards the sealing assembly 32$^{5\prime}$ with the body 36$^{5\prime}$ thereon in its starting state.

As seen in exemplary FIG. 21, the tabs 110 on the sleeve assembly 32 might be maintained fixedly against the associated flange 24 by a stabilizing nut 196 that is threaded to the anchor bolt 28 and captures the tab directly against the upper surface 54 of the flange 24.

Figure 41:
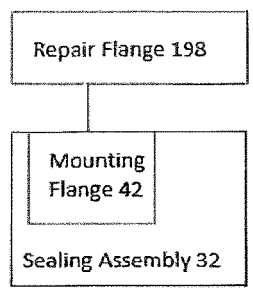
FIG. 41 is a schematic representation of the inventive sealing assembly with an associated repair flange.
Figure 42:
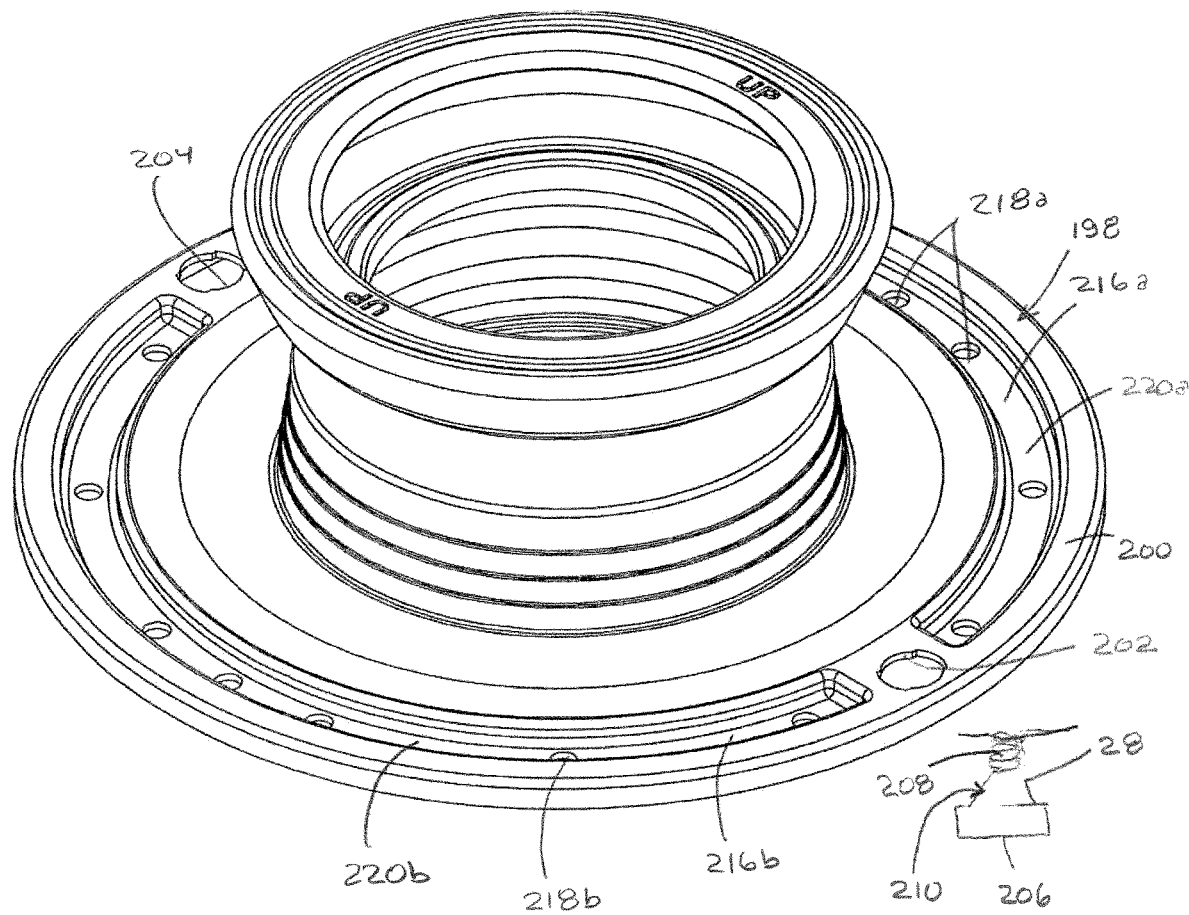
FIG. 42 is a perspective view of one form of the sealing assembly with one exemplary form of repair flange as shown schematically in FIG. 41.
Figure 43:
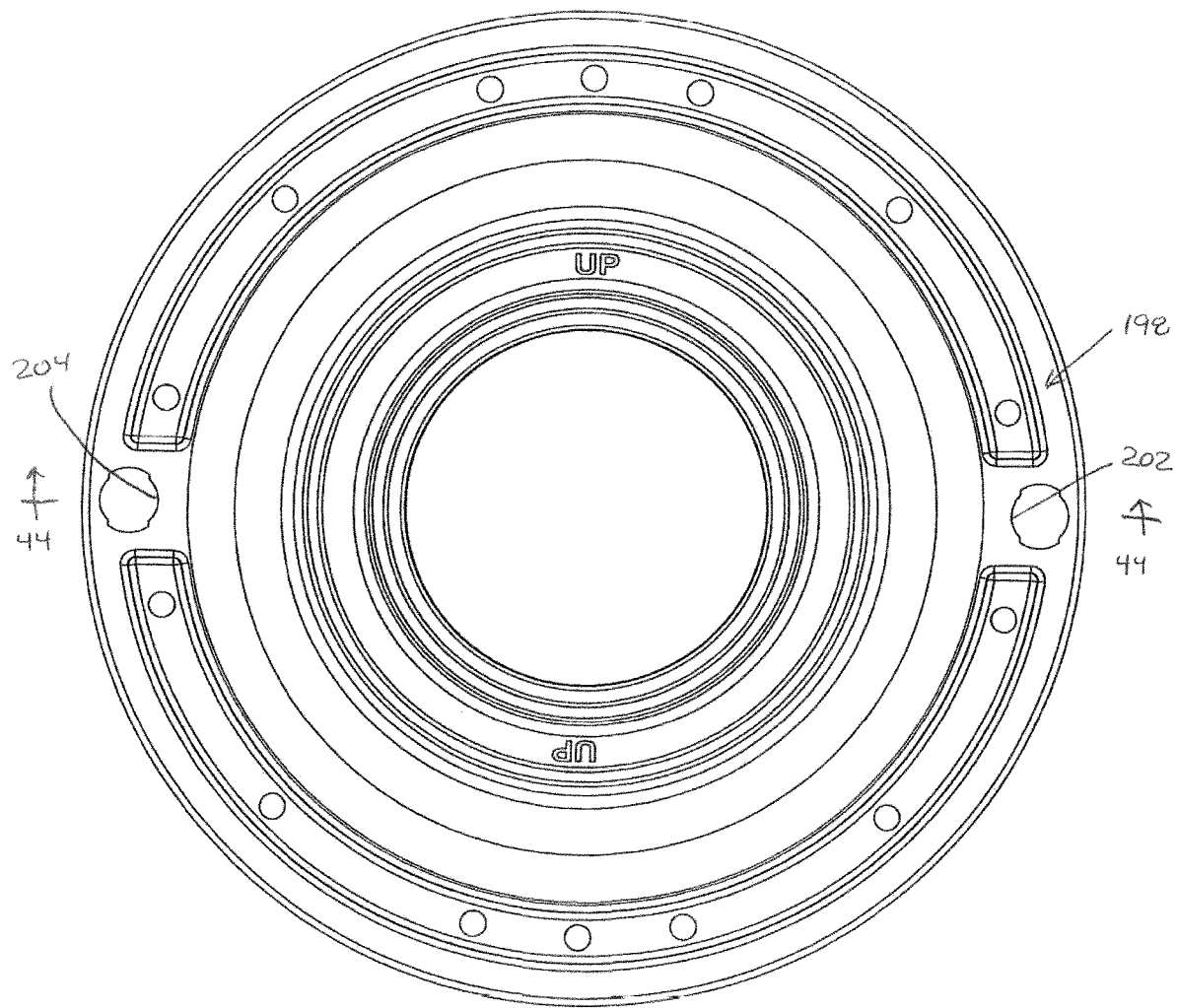
FIG. 43 is a plan view of the components in FIG. 42.
Figure 44:
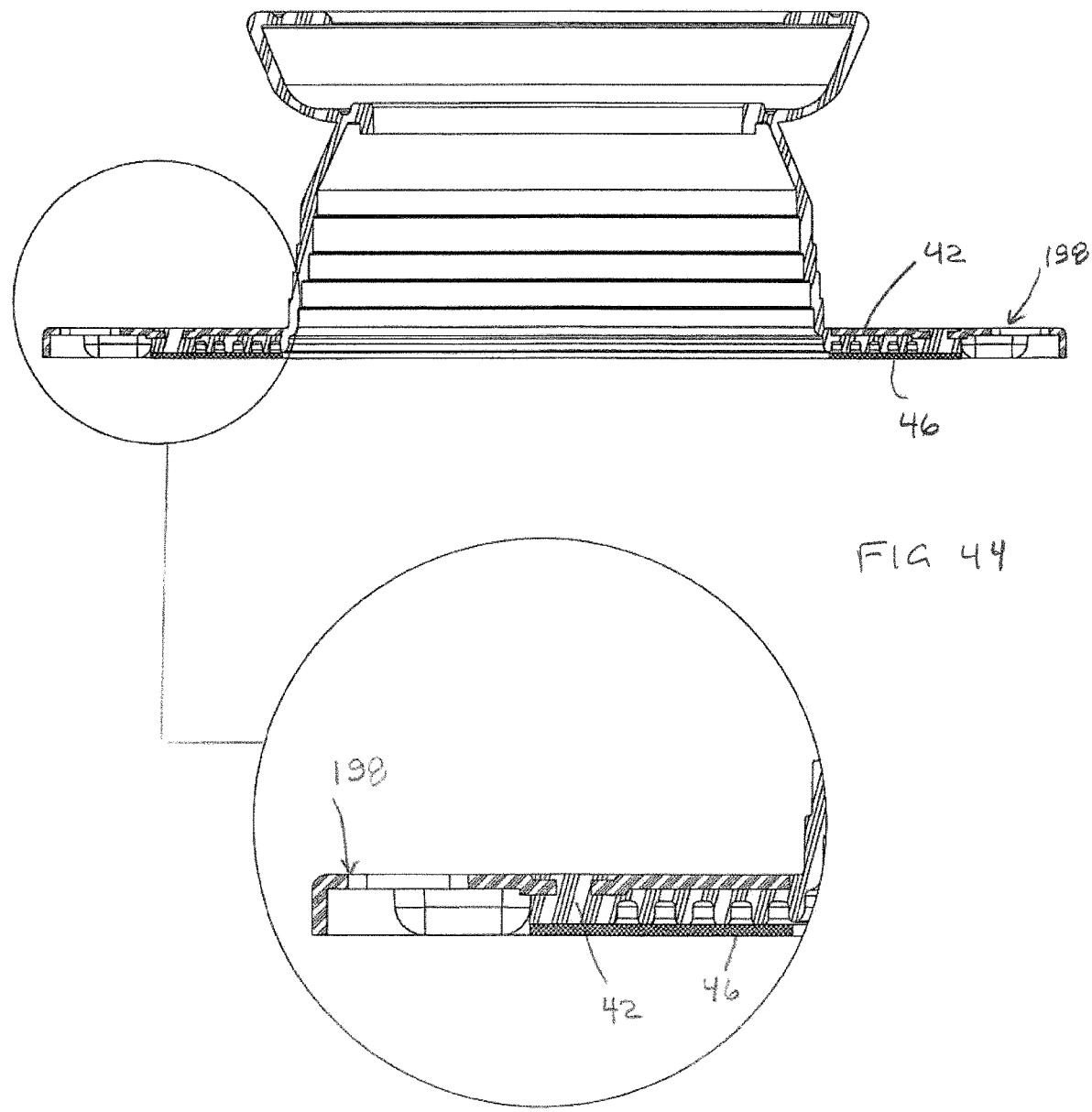
FIG. 44 is a cross-sectional view of the components taken along line 44-44 of FIG. 43.
Figure 45:
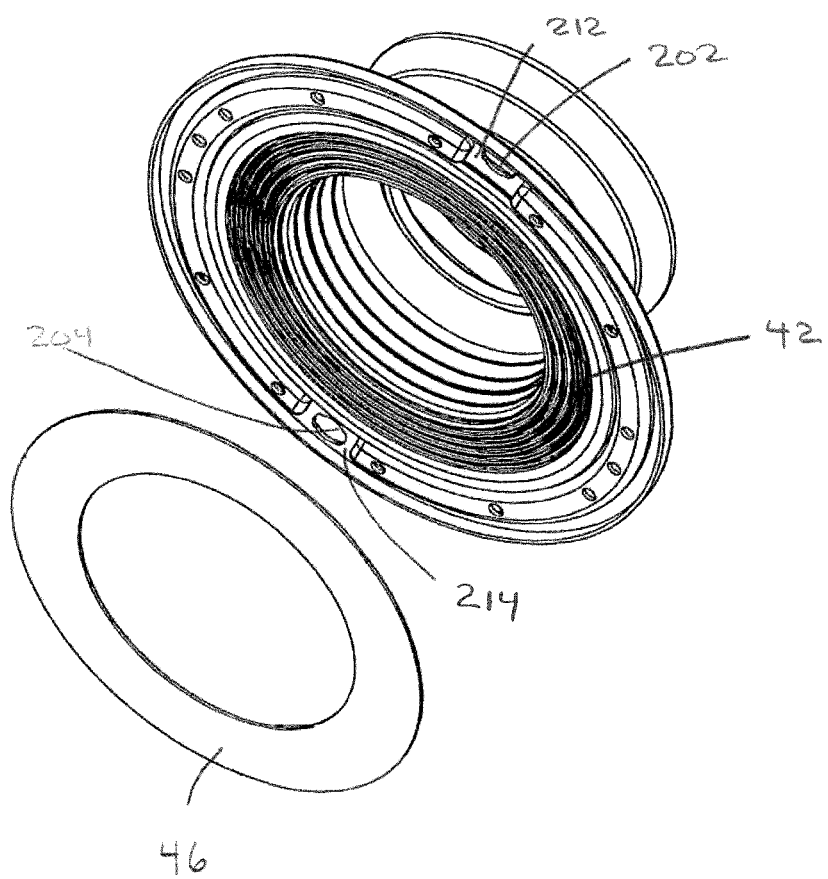
FIG. 45 is a reduced, exploded, perspective view of the components in FIGS. 42-44.
Figure 50:
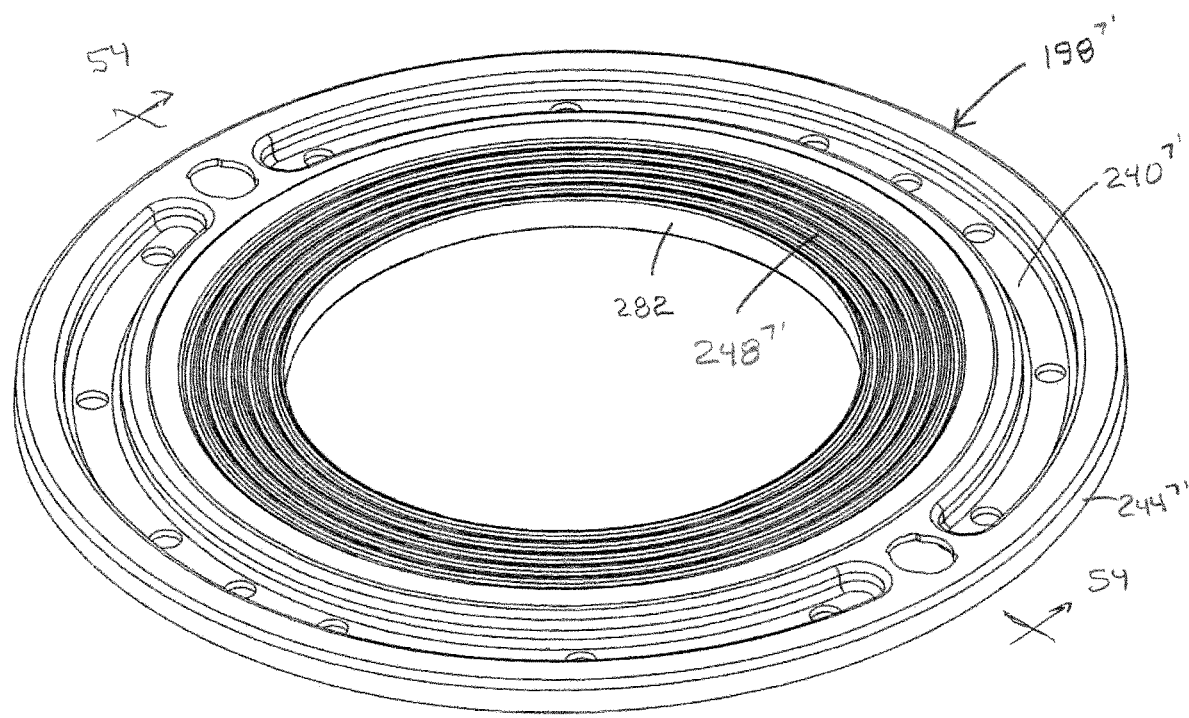
FIG. 50 is a top, perspective view of a modified form of repair flange, corresponding generally to that in FIG. 49.
Figure 53:
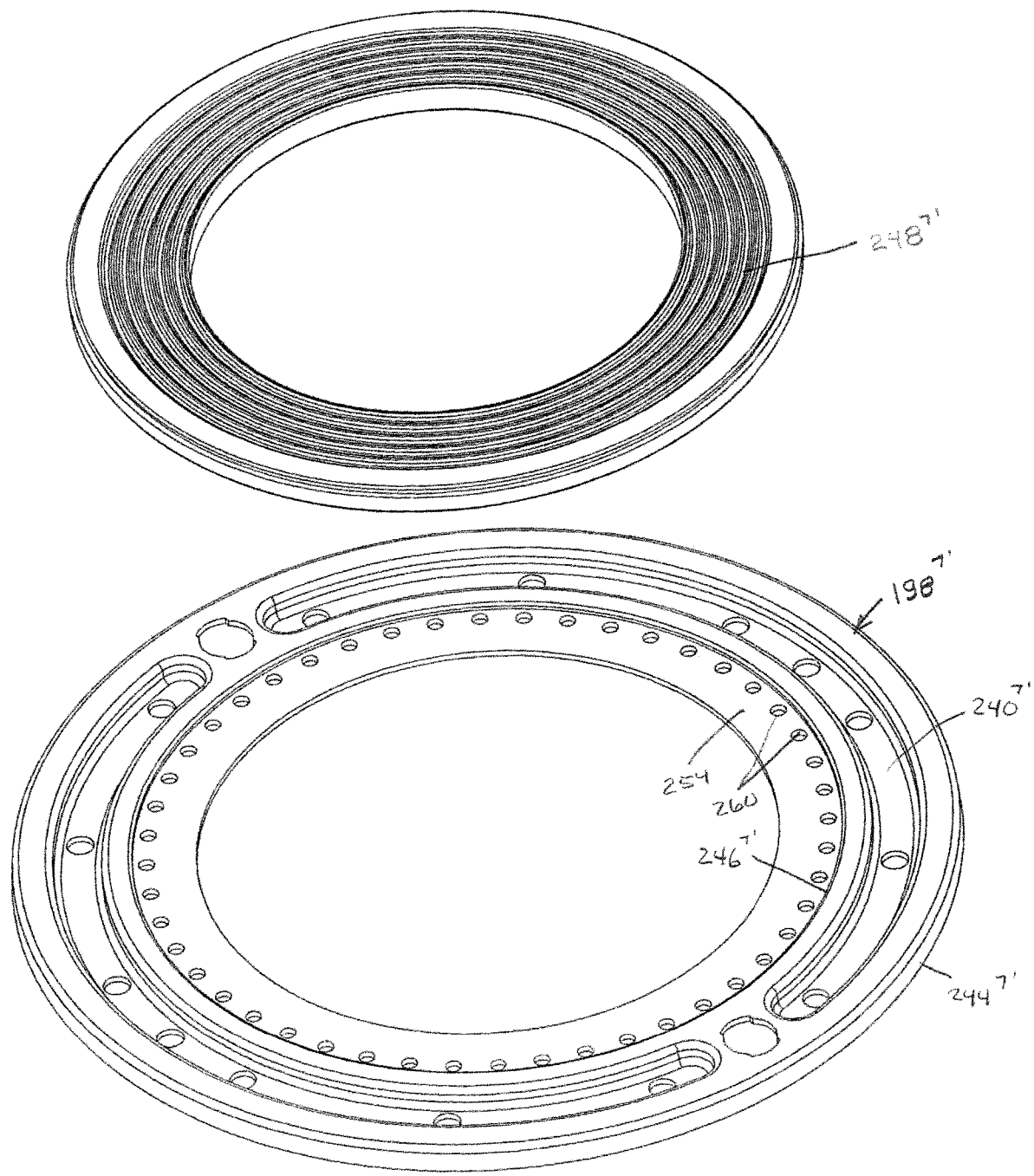
FIG. 53 is an exploded view of the repair flange from the FIG. 50 perspective.
Figure 54:
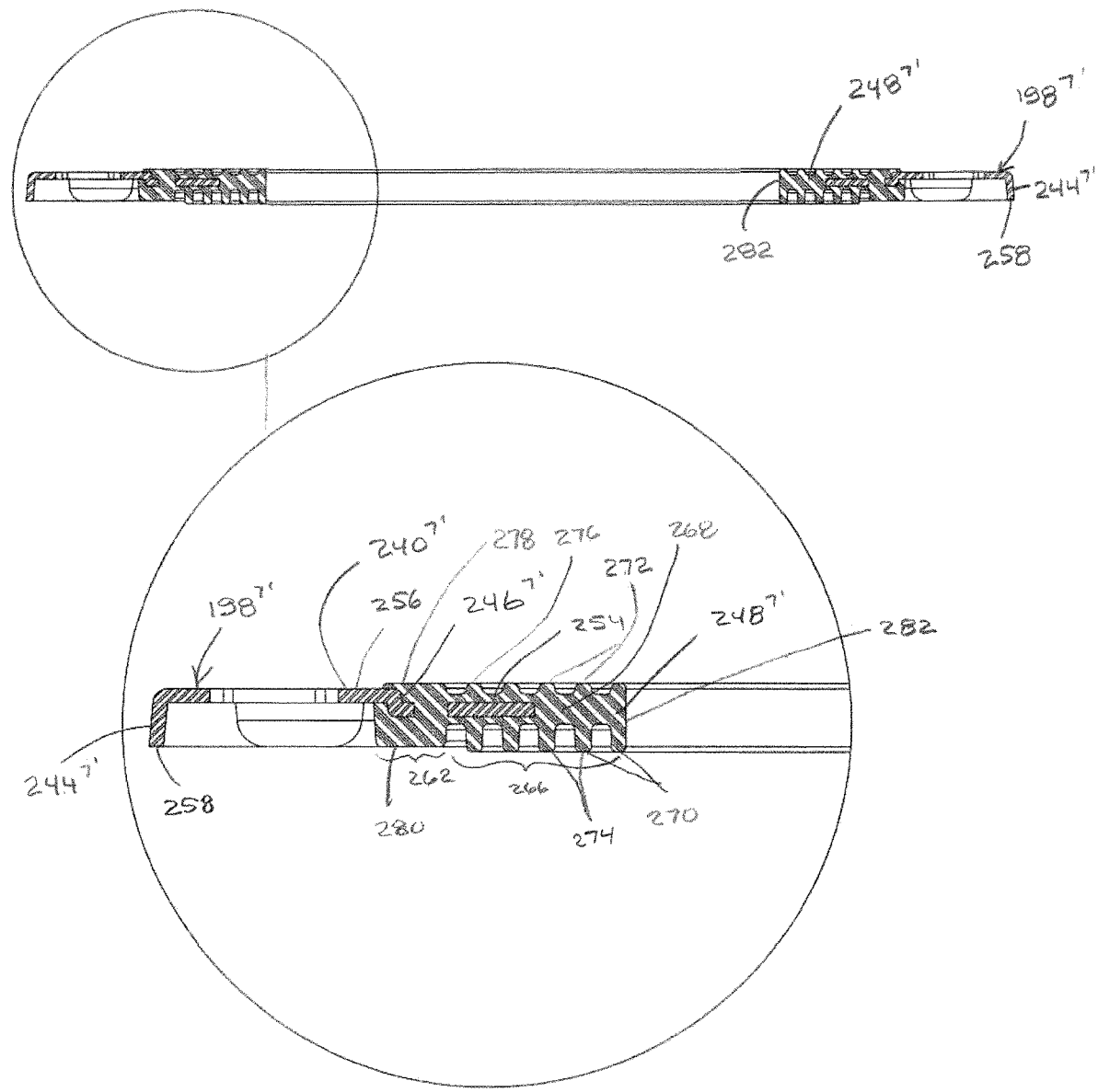
FIG. 54 is a cross-sectional view of the repair flange taken along line 54-54 of FIG. 50.

In an alternative form, as shown schematically in FIG. 41, a repair flange 198 may be placed over the mounting flange 42 on the sealing assembly 32 and secured directly to a support surface 88 or to another closet collar already fixed in place. The repair flange 198 may overlie any portion of the mounting flange 42, including the tabs 110, which may be considered to be a part thereof.

In FIGS. 42-45, a more specific form of the repair flange 198 is shown. Rather than being a separate attached component, the repair flange 198 is integrally molded with the mounting flange 42 to thereby become part of the sealing assembly 32 and perform a primary mounting function.

The repair flange 198 has an annular body 200 with diametrically opposite openings 202, 204, each to accept an anchor bolt 28 that has a squared head 206, a threaded shaft 208, and a tapering transition region 210 between the head 206 and shaft 208. The anchor bolt 28 can be directed upwardly through the openings 202 and is keyed within a receptacle 212, 214, under and adjacent to, the openings 202, 204.

The body 200 has circumferentially spaced, arcuate undercut regions 216a, 216b with openings 218a, 218b through bottom walls 220a, 220b bounding the undercut volumes. Suitable fasteners 26 are directed through the openings 218a, 218b to fix the body 200 to a support surface directly or indirectly through one or more existing closet collar flanges. The optional sealing component 46 cooperates with the downwardly facing surface 52 of the mounting flange 42, as previously described.

The integrally molded/overmolded construction obviates the need for the aforementioned tabs 110. That is, the mounting flange 42 is fixed against shifting radially inwardly relative to an underlying closet collar by the fixed relationship between the repair flange body 200 and mounting flange 42 around the full circumference of the mounting flange 42.

As seen in FIG. 21, the anchor bolts 28 may project significantly above the mounting portion of the toilet 10. In FIGS. 46 and 47, a cutting tool is disclosed at 222 consisting of an elongate flexible component 224 with gripping rings 228 movable as one piece with a length of the elongate flexible element 224.

The elongate flexible element 224 may have an abrading material attached thereto or may be configured, as by braiding, to define a coarse surface and/or a discrete cutting edge.

As shown in FIG. 47, the elongate flexible element 224 can be wrapped around the projecting anchor bolt 28 and drawn back and forth in the path, indicated by the double-headed arrow 230, to progressively remove material and eventually separate a length of the anchor bolt adjacent the free end thereof.

In one preferred form, the anchor bolts 28 have threaded shank portions 232 that are made from a non-metal material to facilitate severance as by the cutting tool 222 or another tool, such as a saw blade, etc.

The body 36 of the sealing assembly 32, in all different versions, can be made from flexible material such as, but not limited to, TPR, TPE, TPU, PVC, SBR, EPDM, neoprene rubber, with or without foaming agents etc. The sealing component 46 may consist of rubber, glue, wax, gel, or other sealing material that may be in existence or devised by one skilled in the art. Foam materials such as EVA, neoprene, silicone, PVC, PE foam, PU foam, or other open or closed cell foams, with or without foaming agents might be utilized.

As shown schematically in FIG. 48, the sealing component 46 might be integrally molded with the mounting flange 42.

While a number of different embodiments for the sealing assembly have been described above, there are several different structures and operating characteristics that are common to some or all of the embodiments.

Whereas many conventional sealing components are compressibly captured directly between a mounted toilet and an upper surface on a closet collar flange, according to the invention, a primary sealing location on the closet collar flange is at the outside corner, obviating the need to captively squeeze one or more sealing components against the upper flange surface.

The sealing assembly configurations, described herein, allow a generic construction to accommodate different closet collar diameters as well as different closet collar configurations. The diameters of the outside corners on many currently available closet collars range between 3¾ inch and 4¾ inch, with there being a slight radius thereat that lends itself to a wrapped sealing by the mounting flange and the underlying sealing component. The described closet collars 20, 20" represent two different variations with respectively 4 inch and 3 inch diameters.

The sealing assemblies depicted have bodies that are designed to accommodate a wide range of site conditions involving a range of different spacings between the upper closet collar flange surface and the final support surface upon which the toilet is mounted. A single configuration may be capable of effecting positive sealing through a substantial spacing range.

Further, the basic principles described above enable one skilled in the art to devise multiple variations of the sealing assembly. In multiple embodiments described above, the body of the sealing assembly sleeve is made with a substantially thin radial dimension along its entire axial extent. The mounting flanges are generally flat and with a thin construction, with the sealing component underlying the downwardly facing mounting surface on the mounting flange being likewise flat with a potentially thin shape that does not add significantly to the combined thickness at the wrapping region of the mounting flange.

Whereas relatively large volume sealing components take up much of the available volume under the mounted toilet and above the closet collar flange, the thin wall construction allows potentially compact folding in a strategic manner wherein the folded and overlapping wall portions may also be diverted away from the flow path between the toilet horn and the drain pipe so as not to obstruct passage therethrough. Further, the compactly folded wall portions remain sufficiently flexible and are diverted into available volumes such that they do not significantly create resistance to the lowering of the toilet during installation or produce a wedge that may maintain the toilet above the support surface in its final mounting position.

Ribs and other rigidifying structures are strategically placed to generally maintain the shape of the sleeve in a symmetrical configuration as the toilet is lowered, even in a skewed orientation. By controlling the reinforcement zones and thicknesses, an axially sliding annular hinge region is produced whereby as the sleeve body is collapsed, the sleeve body wall smoothly, progressively doubles against itself as shown, for example, for the transition from FIG. 24 to FIG. 23 to FIG. 22 to FIG. 21.

With the sealing assembly body in its final state, portions thereof are strategically placed in compression and tension so that residual forces cause a constant wrapping pressure to be applied to the mounting flange while at the same time pressing the toilet horn against the horn engaging region for a positive seal thereat.

A thin foam, rubber, or other material can be used for the sealing component under the mounting flange and can be readily stretched over the outside corner as the toilet is lowered.

Additional versatility is provided by affording the multiple tabs 110, 112. While only one diametrically pair of tabs may be used, the depicted two pair arrangement allows the tabs to be used in different manners. For example, the tabs 110 with a larger through opening may be used for anchor bolts or other fastening components. Seal may not have tabs or could have two or more tabs. The sealing assembly body may be made without tabs or with two or more tabs— potentially greater in number than the four shown.

The tabs 112 have a smaller through opening which may make them more suitable for fasteners to facilitate securing of the mounting flange 42 to a support surface, as through one or more mounting flange layers.

In a preferred form, though not required, the rings 102 are radially spaced and located so that the collective rings 102 span across the outside corner of differently dimensioned closet collar flanges. The rings afford flexibility and generally avoid undue stressing of the first annular portion 96, which may not have any relief design to facilitate bending thereat.

As an alternative to using the aforementioned separate component made as from foam, rubber, etc., the sealing component underlying the mounting flange surface 52 can be incorporated by an overmolding process with a softer material, such as, for example, a 25 durometer TPE, silicone, or other flexible sealing material.

As noted above, the mounting flange may be made from a material that by itself adequately performs the sealing function without an additional sealing component.

It is possible to make the rings 102 from a different material than the upper wall portion 100. However, as depicted, the rings are shown integrally molded therewith as one piece from a material that defines potentially the entire sleeve body 36. Rings may be removed resulting in a flat sealing surface.

The sleeve body may be provided with a number of locally weakened and strengthened zones strategically situated at different locations which produce the desired sequencing of folding, generally as described above. For example, a live hinge point is defined at 234 in FIG. 20 so that the wall 114 and top 104 of the mounting flange tend to fold towards each other at the initiation of the compression of the sleeve body from its starting state. Exemplary live hinge locations are provided at H1 in FIGS. 20 and 33.

The aforementioned ribs 120, 122, combined with the controlled varying thickness of the wall 114, facilitate the progressive folding through a sliding hinge, as described above. The ribs 120, 122 tend to additionally maintain the shape of the body, as does the bead 136 in other configurations.

It is possible to make the rib construction substantially hollow so that when the wall portions are folded against each other as the sleeve body is compressed, they occupy a lesser volume.

The spirally arranged ribs 178 also tend not to cumulatively stack that otherwise produces an undesired increased thickness.

A function of the funnel with the surface 168, as shown in FIG. 34, is to direct water below the top surface of the closet collar flange by defining a drip edge. Closet collar flanges with a bend in the 45° range tend to interfere with the funnel and potentially cause the funnel to collapse. To avoid this interference, the funnel may be removed entirely, with a thicker wall added in place to maintain shape. Whereas the funnel may in certain applications create a drip edge below the upper surface of a collar flange, the body of the inventive sealing assembly, beginning as from the FIG. 24 state, directs the water below the upper surface of the closet collar flange so as to function as a drip edge, thereby obviating the need for a separate element to perform this function.

In FIG. 49, another specific form of the repair flange 198, shown schematically in FIG. 41, and in one specific form in FIGS. 42-45, is shown at $198^{6'}$. The repair flange $198^{6'}$ has an annular body 240 with an upper wall 242 defining an upper sealing surface $546'$ that extends into a depending outer rim 244 and a depending inner rim 246. The rims 244, 246 reinforce the body 240. The repair flange $198^{6'}$ can be mounted directly to a support surface or to an existing closet collar by extending fasteners through the body 240 and the existing closet collar flange into the support surface. Part of the mounting flange 42, such as the tabs 110, 112, may be captured by the repair flange 240, which has a sealing component 248 that acts between the wall 242 and an upper surface on the existing closet collar flange. An outside corner $30^{6'}$ is defined by the body 240.

The body 240 may be made from metal or other material. A metal construction may be provided with a protective coating. Alternatively, a material resistant to corrosion may be utilized, such as stainless steel.

The upper wall 242 of the repair flange $198^{6'}$ may be configured as the previously described flanges to support anchor bolts to project upwardly therefrom for mounting of a toilet.

The sealing component 248 may take a number of different forms. The sealing component 248 may be made from rubber formed into a thin wall that can be maintained in an annular receptacle 250 bounded by the upper wall and rims 244, 246. Fixation of the sealing component 248 may be effected using a separate fastener, such as a rivet, using glue, overmolding the same, etc.

In FIGS. 50-54, a repair flange, corresponding generally to the repair flange 198 in FIG. 49, is shown at $198^{7'}$.

The repair flange $198^{7'}$ has a body $240^{7'}$ with a downwardly projecting annular outer rim $244^{7'}$ and a stepped inner, annular rim $246^{7'}$.

The region between the rims $244^{7'}$ and $246^{7'}$ is shown to have substantially the same configuration as the corresponding region on the repair flange 198 in FIGS. 41-45.

The body $240^{7'}$ extends radially inwardly to define an annular seal support ring 254. The seal support ring 254 resides axially between an upper surface 256 on the body $240^{7'}$ and a plane containing an annular lower edge 258 on the outer rim $244^{7'}$. The seal support ring 254 is axially closer to the upper surface 256 than the plane of the lower edge 258.

The seal support ring 254 has circumferentially spaced openings 260.

Whereas the sealing component 248 is separately formed and attached to the body 240 on the repair flange 198 in FIG. 49, the corresponding sealing component $248^{7'}$ is molded integrally with the body $240^{7'}$. As seen clearly in FIG. 54, the mold parts can be configured so that the molded material can migrate through the openings 260 to embed the seal support ring 254, including the region around the inner rim 246[7'].

The molds are further configured so that the sealing component 248[7'] has an annular region at 262 that is substantially solid over the full axial extent of the sealing component 248[7'] and is contiguous with an annular region 266 defined by a base wall portion 268 from which concentric annular rings 270 depend, and from which concentric, annular rings 272 project upwardly. The rings 270 have a greater axial extent than the rings 272 and bottom edges 274 that cooperatively produce a downwardly facing sealing surface.

The rings 272 have upper edges 276 that may cooperatively perform a sealing function.

The use of concentric rings 270, 272 allows a degree of flexibility which allows the sealing component 248[7'] to axially collapse and deform a certain amount that may facilitate better seal formation.

As depicted, the top 278 of the region 262 is substantially flush with the ring edges 276. The ring edges 274 project below the bottom 280 of the region 262 to facilitate collapsing of the rings 270.

The sealing component 248[7'] is bounded by a radially inwardly facing annular edge 282, defined by radially aligned rings 270, 272, which, together with the wall portion 268, reinforce this region.

The foregoing disclosure of specific embodiments is intended to be illustrative of the broad concepts comprehended by the invention.

The invention claimed is:

1. A method of mounting a toilet with a discharge horn with respect to an upwardly facing support surface at which there is an exposed inlet on a drain pipe and a closet collar with a flange fixed with respect to the support surface and extending around the drain pipe inlet as viewed from above, the fixed flange having a vertical axis, an upper surface and an annular surface portion extending to below the upper flange surface, the upper flange surface transitioning to the annular surface portion at an outside annular corner, the method comprising the steps of:
   obtaining a sealing assembly including a sleeve having a body with an axis, the sleeve body having: a) a top and bottom spaced from each other in an axial direction; b) a radially outwardly projecting mounting flange with an axially downwardly facing surface; c) a top horn engaging region; and d) an annular force transmission region;
   placing the sleeve body in a starting position and a starting state wherein: a) the axis of the sleeve body is generally aligned with the axis of the closet collar flange; and b) the axially downwardly facing surface on the radially outwardly projecting mounting flange extends across, and to radially inside of, the outside annular corner on the closet collar;
   with the toilet horn aligned over the axis of the fixed closet collar flange, lowering the toilet towards the support surface to thereby cause: a) the toilet horn to initially contact the horn engaging region of the sleeve body; b) the toilet to progressively axially compress the force transmission region of the sleeve body; and c) the compressing force transmission region to cause a part of the radially projecting mounting flange to be drawn downwardly as an incident of which an annular region of the axially downwardly facing surface on the radially outwardly projecting mounting flange is forcibly wrapped against the outside corner on the closet collar.

2. The method of mounting a toilet according to claim 1 wherein the sealing assembly further includes at least one sealing component, with the sleeve body in the starting position and the starting state at least a part of the at least one sealing component is situated between the axially downwardly facing surface on the radially outwardly projecting mounting flange and the upper surface of the closet collar flange, and the step of lowering the toilet towards the support surface causes the annular region of the axially downwardly facing surface on the radially outwardly projecting mounting flange to press at least a part of the at least one sealing component, underlying the forcibly wrapped annular region of the downwardly facing surface on the radially outwardly projecting mounting flange, against the outside corner on the closet collar as the annular region of the axially downwardly facing surface on the radially outwardly projecting mounting flange is forcibly wrapped against the outside corner on the closet collar.

3. The method of mounting a toilet according to claim 1 further comprising the step of confining inward radial movement of the radially outwardly projecting mounting flange relative to the upper surface of the closet collar flange at a plurality of circumferentially spaced locations.

4. The method of mounting a toilet according to claim 3 wherein the step of confining inward radial movement of the radially outwardly projecting mounting flange comprises providing first and second tabs on the radially outwardly projecting mounting flange at circumferentially spaced locations and using first and second anchor components that engage the closet collar and respectively engage the first and second tabs.

5. The method of mounting a toilet according to claim 4 wherein the first anchor component comprises a first anchor bolt and further comprising the step of using the first anchor bolt to fix the toilet relative to the support surface with the toilet in a fully mounted position.

6. The method of mounting a toilet according to claim 3 wherein the radially outwardly projecting mounting flange has first and second radially spaced annular portions, the first annular portion radially outside of the second annular portion and more resistant to axial flexing than the second annular portion.

7. The method of mounting a toilet according to claim 6 wherein with the sleeve body in the starting position and the starting state the second annular portion of the radially outwardly projecting mounting flange extends across the outside annular corner.

8. The method of mounting a toilet according to claim 6 wherein the second annular portion of the radially outwardly projecting mounting flange comprises a plurality of spaced annular rings.

9. The method of mounting a toilet according to claim 1 wherein the top horn engaging region is configured so that the top horn engaging region sealingly engages the toilet discharge horn on the toilet with the toilet in a fully mounted position and the sleeve body in a final state.

10. The method of mounting a toilet according to claim 9 wherein the top horn engaging region sealingly engages the toilet discharge horn by compressibly wrapping against an outside peripheral surface on the toilet discharge horn.

11. The method of mounting a toilet according to claim 1 wherein there is an axially facing pushing portion defined on the sleeve body at a transition region between the top horn engaging region and the annular force transmission region, wherein the toilet discharge horn has a bottom region that bears against the axially facing pushing portion to transfer a downward force from the lowering toilet to the annular force transmission region.

12. The method of mounting a toilet according to claim 1 wherein the annular force transmission region on the sleeve body has a wall with a non-uniform radial thickness.

13. The method of mounting a toilet according to claim 12 wherein the annular force transmission region has axially spaced upper and lower annular wall regions and the lower annular wall region of the annular force transmission region is axially collapsible under a lesser axial force than the upper annular wall region of the annular force transmission region, and as the toilet is lowered an axial force is exerted on the lower annular wall region of the annular force transmission region through the upper annular wall region of the force transmission region thereby causing the annular region of the axially downwardly facing surface on the radially outwardly projecting mounting flange to be urged into wrapped engagement with the outside annular corner on the closet collar.

14. The method of mounting a toilet according to claim 13 wherein the sealing assembly is configured so that as the toilet is lowered at least a part of the upper annular wall region of the annular force transmission region is placed in compression and at least a part of the lower annular wall region of the annular force transmission region is placed in tension and thereby exerts a force that draws the annular region of the axially downwardly facing surface on the radially outwardly projecting mounting flange against the outside corner on the closet collar.

15. The method of mounting a toilet according to claim 13 wherein the sealing assembly is configured so that as the toilet is lowered the sleeve body controllably collapses and an axial length of the upper annular wall region of the annular force transmission region moves into axially overlapping relationship with an axial length of the lower annular wall region of the annular region of the annular force transmission region, with the axial length of the upper annular wall region of the annular force transmission region residing radially inside of the axial length of the lower annular wall region of the annular force transmission region.

16. The method of mounting a toilet according to claim 12 wherein the wall on the annular force transmission region has a plurality of axially spaced steps defining annular reinforcing ribs.

17. The method of mounting a toilet according to claim 1 wherein with the toilet lowered to a fully mounted position, the sleeve body assumes a final state wherein a part of the top horn engaging region is urged against the radially outwardly projecting mounting flange so as to thereby urge a part of the annular region towards the outside corner of the closet collar.

18. The method of mounting a toilet according to claim 1 wherein the sleeve body comprises an outer wall and a funnel body in axially overlapping relationship with the outer wall and having a portion residing radially inside of the outer wall and spaced radially from the outer wall with the sleeve body in the starting state.

19. The method of mounting a toilet according to claim 2 wherein the at least one sealing component is molded integrally with the sleeve body.

20. The method of mounting a toilet according to claim 4 wherein a repair flange is obtained and further comprising the step of placing the repair flange over the first and second tabs and using first and second anchor bolts extending upwardly through the repair flange to fix the toilet in a final mounting position.

21. A sealing assembly as recited in claim 1.

22. The method of mounting a toilet according to claim 1 wherein the radially outwardly projecting mounting flange has a thickness, over an annular portion of the radially outwardly projecting mounting flange at which the annular region of the axially downwardly facing surface is formed, that is substantially maintained as the annular region of the axially downwardly facing surface is forcibly wrapped against the outside corner on the closet collar.

23. The method of mounting a toilet according to claim 1 wherein the radially outwardly projecting mounting flange has an annular portion, at which the annular region of the axially downwardly facing surface is formed, that is placed in tension as an incident of the annular region of the axially downwardly facing surface being forcibly wrapped against the outside corner on the closet collar.

* * * * *